(12) United States Patent
Chen et al.

(10) Patent No.: US 12,518,141 B2
(45) Date of Patent: Jan. 6, 2026

(54) MACHINE LEARNING MODEL FOR IMAGE FORGERY DETECTION

(71) Applicant: PayPal, Inc., San Jose, CA (US)

(72) Inventors: Zhe Chen, Singapore (SG); Panpan Qi, Singapore (SG); Jiazheng Zhang, Singapore (SG); Jiyi Zhang, Singapore (SG); Quan Jin Ferdinand Tang, Singapore (SG)

(73) Assignee: PayPal, Inc., San Jose, CA (US)

( * ) Notice: Subject to any disclaimer, the term of this patent is extended or adjusted under 35 U.S.C. 154(b) by 150 days.

(21) Appl. No.: 18/189,044

(22) Filed: Mar. 23, 2023

(65) Prior Publication Data

US 2024/0320471 A1  Sep. 26, 2024

(51) Int. Cl.
*G06F 21/31* (2013.01)
*G06N 3/045* (2023.01)
*G06N 3/0895* (2023.01)

(52) U.S. Cl.
CPC ............. *G06N 3/045* (2023.01); *G06F 21/31* (2013.01); *G06N 3/0895* (2023.01)

(58) Field of Classification Search
CPC ... H04L 63/0876; H04L 67/535; G06N 20/00; G06N 3/0464; G07N 3/088
See application file for complete search history.

(56) References Cited

U.S. PATENT DOCUMENTS

| | | | |
|---|---|---|---|
| 2009/0018940 A1* | 1/2009 | Wang | G06Q 40/00 705/35 |
| 2020/0285737 A1* | 9/2020 | Kraus | G06F 21/552 |
| 2020/0380119 A1* | 12/2020 | Correa Bahnsen | G06F 21/566 |
| 2022/0358289 A1* | 11/2022 | Chen | G06F 18/2415 |
| 2024/0177161 A1* | 5/2024 | Gils | G06Q 30/0609 |

OTHER PUBLICATIONS

"On the Detection of Digital Face Manipulation," Hao Dang, et al., Department of Computer Science and Engineering, Michigan State University, East Lansing, MI, 2020, pp. 5781-5790.
(Continued)

*Primary Examiner* — Tom Y Chang
(74) *Attorney, Agent, or Firm* — Kowert, Hood, Munyon, Rankin & Goetzel, P.C.; Dean M. Munyon

(57) ABSTRACT

Techniques for predicting whether a submission includes a forged image. A computer system receives a submission from a user that includes an image and image metadata, such as an identifier for the user and a User-Agent string value. An image pixel embedding is generated from the image, and a profile embedding is generated from the image metadata. The image embedding is indicative of whether the image is similar to known image forgeries. The profile embedding is generated from a user activity embedding indicative of User-Agent values associated with the user identifier. The profile embedding is generated using a machine learning model that uses stored parameters to associate user activity, device information, and forgery groups. The profile embedding thus indicates whether the user is associated with known image forgeries. The image pixel embedding and profile embedding are then used by a neural network to output a forgery prediction.

20 Claims, 15 Drawing Sheets

(56) References Cited

OTHER PUBLICATIONS

"Exposing Digital Forgeries in Color Filter Array Interpolated Images," Alin C. Popescu, et al., IEEE Transactions on Signal Processing, vol. 53, No. Oct. 10, 2005, pp. 3948-3959.
"Fasttext.Zip: Compressing Text Classification Models," Armand Joulin, et al,. Facebook AI Research, Dec. 12, 2016, pp. 1-13.
"Long Short-Term Memory," Neural Computation, Sepp Hochreiter, Technische Universitat Muchen, Muchen, Germany and Jurgen Schmidhuber, IDSIA, Lugano Switzerland, 1997, pp. 1-32.
"Fighting Fake News: Image Splice Detection via Learned Self-Consistency," Minyoung Huh, et al., UC Berkeley and Carnegie Mellon University, ECCV 2018, pp. 1-17.

* cited by examiner

MACHINE LEARNING MODEL FOR IMAGE FORGERY DETECTION

BACKGROUND

Technical Field

This disclosure relates generally to analysis of a digital submission and, more specifically, to image forgery analysis.

Description of the Related Art

Various online services commonly require user authentication. For example, users may use a password or a PIN when authenticating to a given service. Services that facilitate sensitive operations (e.g., banks, payment processing services) may require additional forms of authentication (i.e., multi-factor authentication) to further confirm the user's identity before providing access to the service. In some cases, authentication may be based on an image (e.g., an image of the user submitting the service request). Such images may be part of an official document such as a driver's license, passport, or school or employee identification card in some cases.

DETAILED DESCRIPTION

Figure 1:
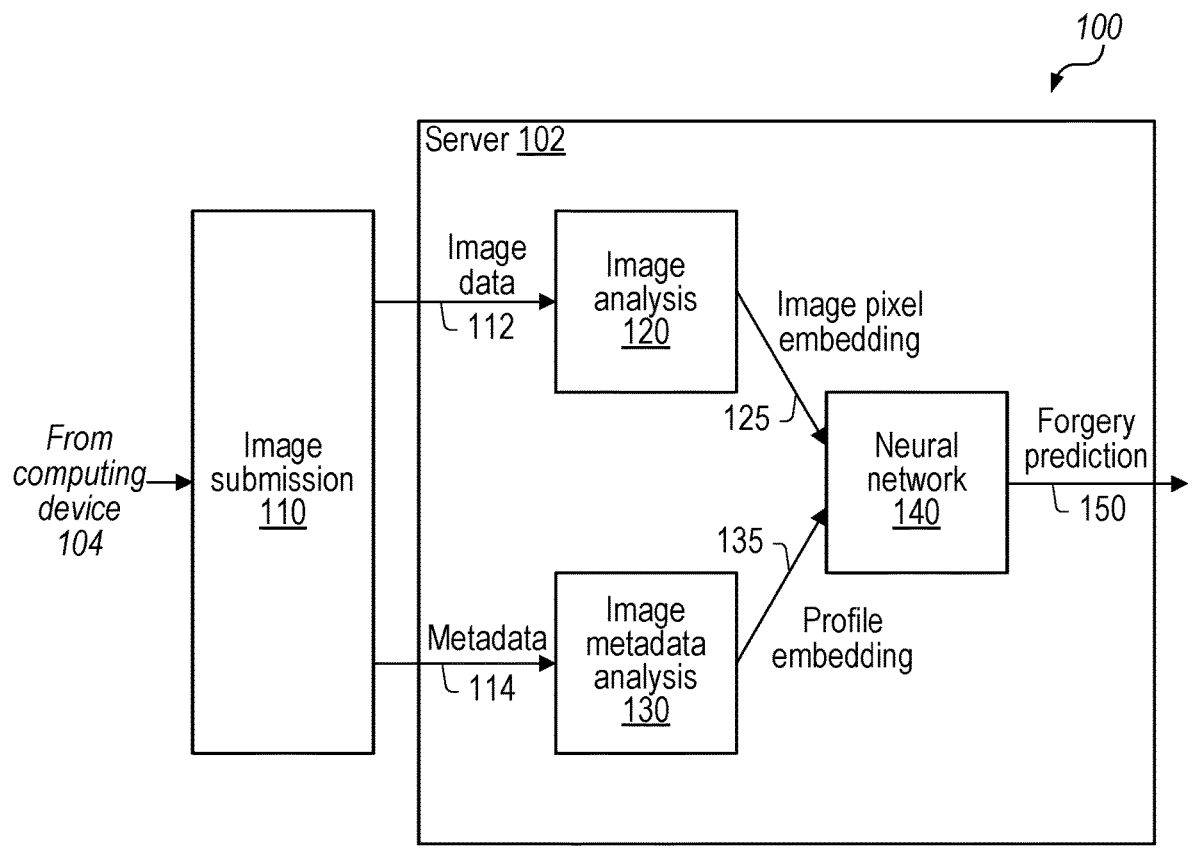
FIG. 1 is a block diagram of one embodiment of a system for image forgery detection.

As the Internet develops, the need for authentication increases as well. Many authentication scenarios involve submission of an image (e.g., an identification or ID photo). But such images may be altered before submission (e.g., using image editing software), leading Internet services to employ techniques to detect image forgeries. These techniques can prevent fraud and other criminal activity such as identity theft.

Using automation, malicious actors can use computing devices to generate many forged documents and make repeated requests for authentication to services within a short period of time. This automation of fraudulent submissions poses problems for websites and services that require document verification before proceeding with further action. To succeed, all an attacker needs is for one fraudulent transaction to be approved out of possibly hundreds or thousands of submitted transaction requests. This issue is exacerbated by having multiple automated accounts coordinate attacks using hundreds of devices and many different user accounts. There is thus a rising demand for forgery detection techniques.

Images have commonly been manually validated by large numbers of trained human experts. But those experts are slow and often costly. There is thus a desire to increase the accuracy and speed of the document verification process to supplement or replace expensive human review.

Attempts have been made to automate document verification to reduce reliance on human experts. Traditional analysis methods use the image itself when examining potential fraud. For example, compression ratios between an original area and an altered area of the image will be different, thus indicating a possible forgery. More recently, machine learning models that are trained using previous forged images have been used to provide more accuracy than traditional methods. For example, data within an image may be used to detect face manipulation by applying an attention mechanism that extracts relevant portions of an image that indicate a forgery.

The inventors have recognized that these techniques (whether manual or automated in nature) rely only on analysis of the image itself when attempting to detect forgery. The inventors have recognized that other information, such as information relating to the computing device from which the image originated, can also be useful in an image forgery analysis. The inventors thus propose to use this type of information along with analysis of the image itself in order to make a forgery prediction. One such type of image origin metadata that is proposed to be used relates to the software entity that submitted the image (i.e., the "user agent"), which may be a web browser.

Additionally, the inventors have noticed that automated image forgeries frequently occur in short bursts of activity. As such, the inventors propose that burst information be incorporated into image forgery analysis, if desired. Still further, the inventors have noticed that although bots (automated programs) commonly seek to evade image forgery analysis by making submissions from multiple user ids and multiple user agents, these bots can still exhibit similar properties. Accordingly, the inventors propose to utilize a machine learning model that is based on relationships between historical user activity information, device information, and known forgeries to create a profile embedding that can be used in conjunction with image analysis techniques to make a forgery prediction.

FIG. 1 is a block diagram of one embodiment of system for image forgery detection. As depicted, system 100 includes a computer server 102 that receives, from computing device 104, an image submission 110. Computer server 102 includes image analysis module 120, image metadata analysis module 130, and neural network 140.

Image submission 110, as shown, includes image data 112 and image metadata 114. Image 112 is provided to image analysis module 120, which produces an image pixel embedding 125. Similarly, image metadata 114 (which can include the user identifier of the submission and information relating to the user agent making the submissions, etc.) is provided to image metadata analysis module 130, which generates a profile embedding 135. As will be discussed, module 130 can, in some embodiments, utilize machine learning techniques that relate device information to known forgeries in order to generate profile embedding 135. Profile embedding 135, as the name suggests, is a profile of the characteristics of the submission apart from the image itself. Neural network 140 can then use image pixel embedding 125 and profile embedding 135 to generate a forgery prediction 150.

The paradigm of FIG. 1 thus utilizes an analysis of the image itself along with analysis of image metadata (including image origin metadata) in order to make forgery prediction 150. This combination leads to more accurate forgery predictions. This methodology allows user activity information to be related to known forgeries. The use of burst information can further improve forgery prediction 150.

Figure 2:
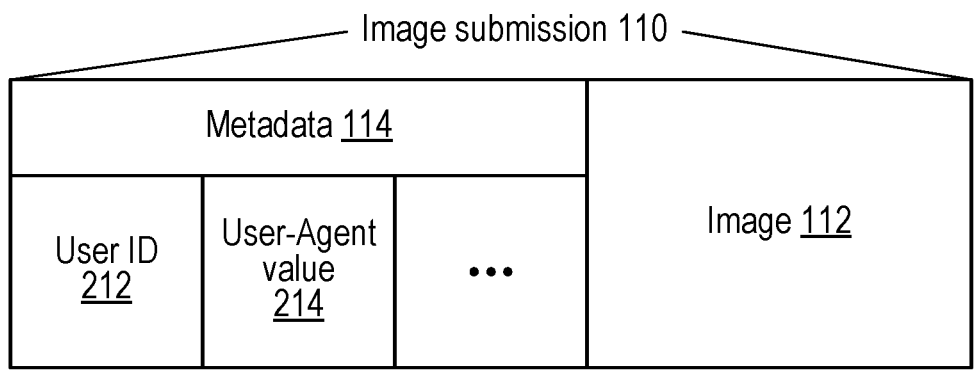
FIG. 2 illustrates one example of an image submission.

FIG. 2 illustrates one example of an image submission. As depicted, image submission 110 includes image 112 and metadata 114. As shown, metadata 114 includes user id 212, and User-Agent (UA) value 214, but may also contain additional types of metadata. For example, metadata 114 may also include a timestamp indicative of the time when the image was submitted to server 102.

Image submission 110 is comprised of one or more packets submitted by computing device 104. In some embodiments, image submission 110 is accomplished via an application programming interface (API) function of an application. But in other embodiments, submission 110 is created by device 104 directly uploading an image via a browser using, for example, an HTML PUT request.

Image data 112 is comprised of the one or more images that are submitted. In some embodiments, image data 112 may be comprised of a single image (e.g., a scan of a driver's license) or multiple images (e.g., a PDF file comprised of multiple scanned pages of a passport). In some embodiments, image data 112 may be an image portion of an official document that is used for ID-based verification.

In contrast to image data 112, metadata 114 is information about image data 112. Of particular interest are types of metadata relating to the origin of image 112 (but metadata 114 can be any suitable type of information.) As depicted, metadata 114 can include user id 212 and UA value 214, which are discussed further below. Metadata 114 may also contain additional elements related to the origin of the image in other embodiments (e.g., image EXIF data, the IP address of device 104, etc.)

Generally speaking, image submission 110 is submitted to server 102 by a computer program on behalf of a user. Two of the types of metadata 114 depicted in FIG. 2 provide more detail on these two entities. User id 212 identifies the user on whose behalf the submission was made, while UA (User-Agent) value 214 identifies the software entity that actually made the submission.

User id 212 is an identifier that allows server 102 to distinguish between different entities making requests (e.g., "id0044," "john_smith"). In some cases, User id 212 may be different from a user id associated with the service in question. In other words, user id 212 might be used only by server 102 on an internal basis.

The computer program that actually makes the submission to server 102 (e.g., through an HTTP command) is referred to in the art as a "user agent." User agents are commonly browsers, but they can also be other programs such as apps. In some cases, these apps may be malicious (bots).

User agents typically identify themselves to servers in HTTP requests using a header containing a string value that provides information to other computers about the submitting entity (e.g., application, operating system, vendor, version, etc.). This string value is shown in FIG. 2 as UA value 214. For example, a WINDOWS 10-based PC that uses the Edge browser might have the following UA value: "Mozilla/5.0 (Windows NT 10.0; Win64; x64) AppleWebKit/537.36 (KHTML, like Gecko) Chrome/42.0.2311.135 Safari/537.36 Edge/12.246." Typically, a UA value includes substrings identifying the application, the application version, and additional comments related to the software such as the operating system and the device. As such, the substring "AppleWebKit/537.36 (KHTML, like Gecko)" describes that the browser's engine is based on the KHTML browser engine, while the substring "(Windows NT 10.0; Win64; x64)" identifies the submitting device's operating system (Windows NT), version (10.0) and instruction set architecture (ISA) (x64.) The latter substring in particular may, in some cases, facilitate the classification and analysis of user agents, as discussed herein.

Given the large variety of devices with Internet access, many possible UA combinations are possible. For example, a CHROME browser on an IPHONE 6 will identify itself to servers using a different UA value than a SAFARI browser on the same phone. Furthermore, as shown in the table below, different device types, including phones, tablets, desktops, each have their own UA value. For this reason, the inventors have found that a device's UA value is a reasonable proxy for the type of the device making the submission. But note that a single device type (e.g., a WINDOWS 10 PC) can submit different UA values based on different types of software that are used for the submission. Further note that UA values are not limited to smartphones and PCs but may also include gaming consoles, web crawlers and streaming devices. A number of possible UA values for different devices is illustrated in Table 1.

TABLE 1

| Device | User-Agent value |
|---|---|
| SAMSUNG GALAXY S22 | Mozilla/5.0 (Linux; Android 12; SM-S906N Build/QP1A.190711.020; wv) AppleWebKit/537.36 (KHTML, like Gecko) Version/4.0 Chrome/80.0.3987.119 Mobile Safari/537.36 |
| IPHONE 12 | Mozilla/5.0 (iPhone13, 2; U; CPU iPhone OS 14_0 like Mac OS X) AppleWebKit/602.1.50 (KHTML, like Gecko) Version/10.0 Mobile/15E148 Safari/602.1 |
| WINDOWS 10-based PC using EDGE browser | Mozilla/5.0 (Windows NT 10.0; Win64; x64) AppleWebKit/537.36 (KHTML, like Gecko) Chrome/42.0.2311.135 Safari/537.36 Edge/12.246 |
| WINDOWS 10-based PC using FIREFOX browser | Mozilla/5.0 (Windows NT 10.0; Win64; x64; rv: 109.0) Gecko/20100101 Firefox/109.0 |
| CHROMECAST | Mozilla/5.0 (CrKey armv7l 1.5.16041) AppleWebKit/537.36 (KHTML, like Gecko) Chrome/31.0.1650.0 Safari/537.36 |
| PLAYSTATION 5 | Mozilla/5.0 (PlayStation; PlayStation 5/2.26) AppleWebKit/605.1.15 (KHTML, like Gecko) Version/13.0 Safari/605.1.15 |
| GOOGLE bot | Mozilla/5.0 (compatible; Googlebot/2.1; +http://www.google.com/bot.html) |
| BING bot | Mozilla/5.0 (compatible; bingbot/2.0; +http://www.bing.com/bingbot.htm) |

Although whatever set of information that is required by the API of server 102 (e.g., user id 212 and UA value 214) must be supplied to initiate a transaction with system 100, a malicious entity can still seek to obfuscate its true nature. For example, a malicious actor (e.g., a bot) might generate and make submissions with multiple user ids. Further, under each of these user ids, a bot can generate requests with multiple UA values. Due to the nature of HTML requests, the UA values presented to server 102 can be spoofed. For example, a bot may submit, from a WINDOWS PC, requests with UA values for an IPHONE and a SAMSUNG GALAXY S22. In spite of these attempts at obfuscation, the disclosed techniques can still seek to exploit similarities in bot behavior in order to improve forgery prediction 150.

Figure 3:
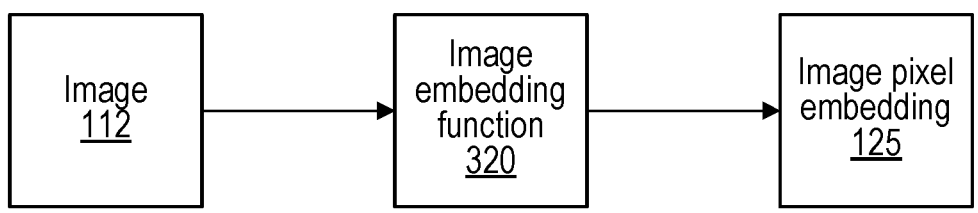
FIG. 3 is a block diagram of one embodiment of an image analysis module.

FIG. 3 is a block diagram of one embodiment of image analysis module 120. As shown, module 120 includes an image embedding function 320. Function 320 receives image 112 and generates image pixel embedding 125.

This disclosure makes various references to embeddings. As used herein, an "embedding" is a numeric representation of an object or relationship, expressed as a vector. Many machine learning models use numeric data as inputs, specifically low-dimensional numeric data. In some cases, information that needs to be supplied to a machine learning model may not originally exist in numeric form, which means that this information corresponds to high-dimensional vectors. An embedding is a low-dimensional vector compared to inputs such as text, images, etc. Furthermore, an embedding is generally a relatively "dense" numeric representation compared to techniques such as one-hot encoding. Advantageously, distance within a vector space in which embeddings of items exist can be used to quantify the similarity between items.

Image embedding function 320 encodes image data 112 into image pixel embedding 125. In general, embedding function 320 might extract the individual occurrence of each color (or color group) of an image and place the occurrences into a one-dimensional vector. The information contained within the embedding vector could then be used in a variety of applications, such as identifying the type of scenery the image depicts. If the identification function detects, for example, that there are some threshold number of green pixels, it may be inferred that that the image is of a forest. In the embodiment of FIG. 3, however, image embedding function 320 is used to help determine the authenticity of image 112. In some embodiments, image embedding function 320 is a convolutional neural network (CNN) that generates image pixel embedding vectors based on whether certain pixels are similar to digitally modified pixels in other images. The vector can then be used by a machine learning model (e.g., classifiers such as neural network 140) to identify forgeries.

But as has been noted, the inventors do not propose to rely solely on analysis of image 112. Instead, the disclosed forgery detection paradigm also relies on analysis of image metadata 114. This analysis, and the training of the model used to perform such analysis, is described next with respect to FIGS. 4-8.

Figure 4:
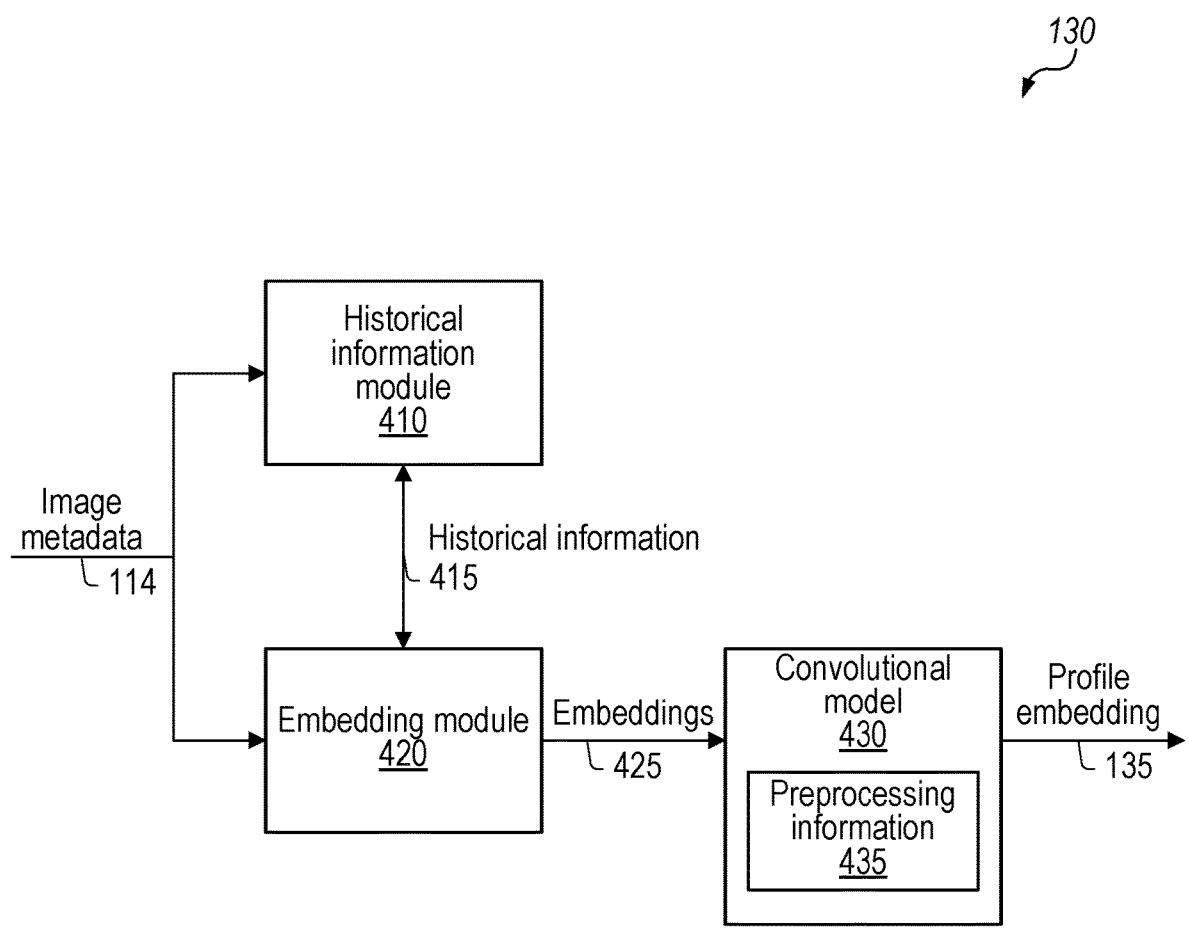
FIG. 4 is a block diagram of one embodiment of an image metadata analysis module.

FIG. 4 is a block diagram of one embodiment of image metadata analysis module 130. As shown, module 130 includes historical information module 410, embedding module 420, and convolution model 430. Module 130 receives image metadata 114 as an input. As explained with respect to FIG. 2, image metadata 114 may include the user id of the submitting user, a current User-Agent (UA) value that made the submission, and the like. Module 130 produces profile embedding 135 as output.

As its name suggests, historical information module 410 includes information about past submissions to system 100. Accordingly, block 410 can store, among other things, image metadata 114 corresponding to previous submissions. By supplying metadata 114 to historical information module 410, retrieved historical information 415 may be provided to embedding module 420. For example, by supplying current user id 212 to historical information module 410, information about past submissions with the same user id can be retrieved. The nature of the types of historical information that can be stored in module 410 is described in more detail with respect to FIG. 5A.

As shown, image metadata 114 is also supplied to embedding module 420. Module 420 can receive, as inputs, information about the current submission (i.e., image metadata 114) and information about past submissions (i.e., historical information 415) that are related to the current submission in some way (e.g., they have the same user id). Broadly speaking, the function of module 420 is to create embeddings 425 based on these inputs. Embeddings 425 may vary based on whether the model is being trained or not. In a training mode, embeddings 425 may include, in one embodiment, an embedding representative of the UA value for the current submission, an embedding representative of historical UA values for the user id of the current submission, and an embedding representative of UA values associated with a forgery group (if any) to which image 112 belongs. In a non-training mode (i.e., where system 100 has already been trained and has been deployed for actual use), embeddings 425 may include, in one embodiment, an embedding representative of historical UA values for the user id of the current submission. An example of embedding module 420 is described in further detail with respect to FIGS. 6A-D.

Convolution model 430 receives one or more embeddings from module 420 and generates profile embedding 135, which is indicative of whether a given image submission is likely to be associated with a forgery based on metadata associated with the submission. Before model 430 is used in one embodiment, it undergoes a preprocessing phase and a training phase. During the preprocessing phase (described further with respect to FIG. 7A), preprocessing information 435 is obtained from a set of training data. In one embodiment, preprocessing information 435 includes 1) a graph that relates user ids and associated UA values, 2) a graph that relates UA values and known image forgeries, and 3) an initial forgery group embedding. In a training phase (described further with respect to FIGS. 7B-C), this preprocessing information 435 is used, along with device embeddings for entries in a set of training data, to train convolution model 430 to learn the relationships between user activity, devices, and known image forgeries. As will be described with respect to FIG. 8, after the training phase is complete, model 430 can now be deployed for use. model 430 receives an embedding indicative of historical UA values associated with the current user id for the submission, and then apply these UA values to trained model 430 in order to generate an appropriate profile embedding 135. Embedding 135 can then be supplied to neural network 140 along with image pixel embedding 125 to make forgery prediction 150.

Figure 5A:
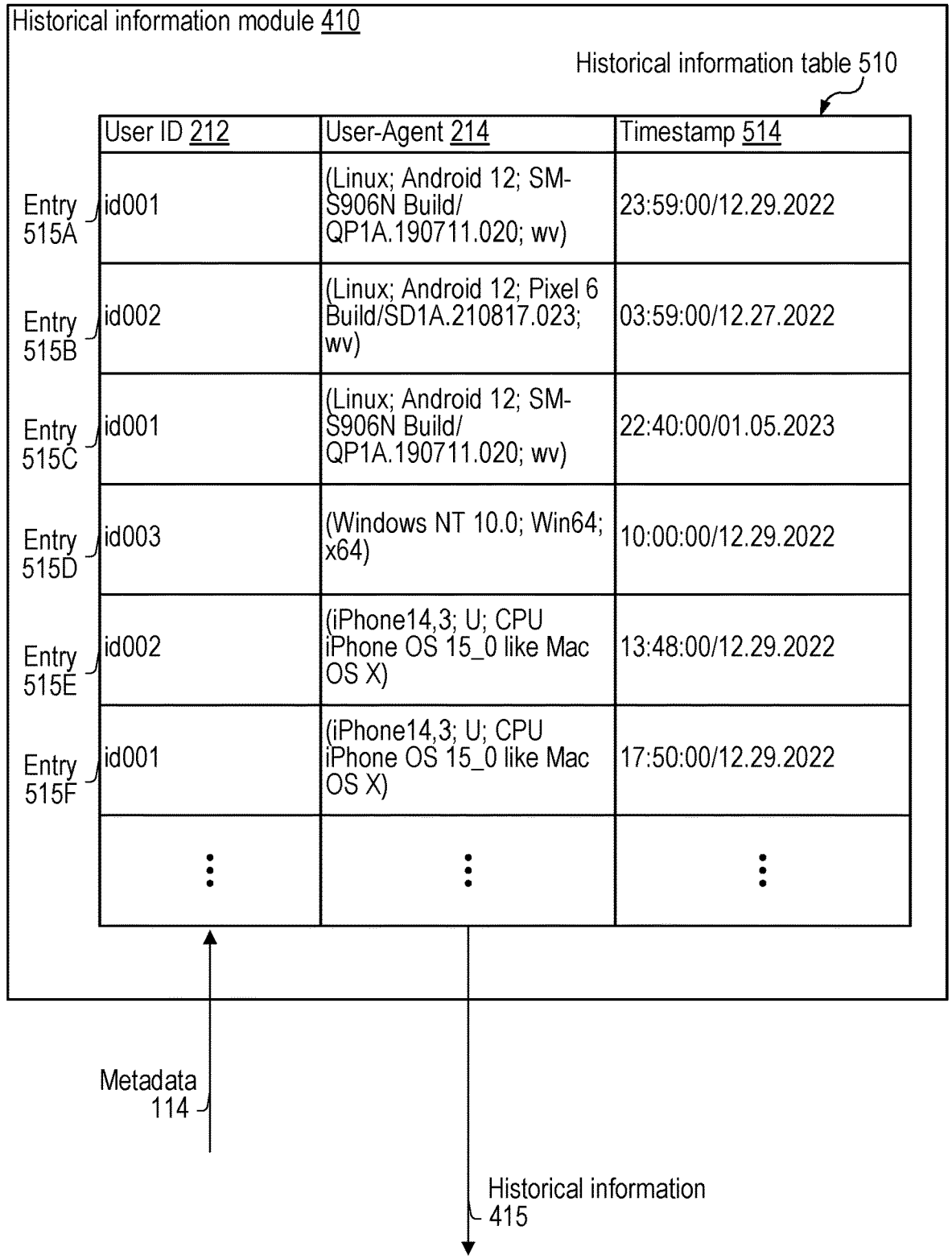
FIG. 5A is a block diagram of one embodiment of a historical information module.

FIG. 5A is a block diagram of one embodiment of historical information module 410, which includes historical information table 510. (Other potential components of module 410 are discussed with respect to FIG. 5B.) Module 410 receives metadata 114 and outputs historical information 415.

Historical information table 510 contains multiple entries 515, each of which corresponds to a particular past submission, typically over some predefined time period (e.g., the past three months). A given entry, as shown, can include a user id 212, a User-Agent (UA) value 214, and a timestamp 514. Other types of information may be collected in other embodiments. Table 510 can be organized in any suitable manner, such as a database table in which user id 212 is the primary key. In other embodiments, table 510 could be a file (e.g., a JSON file) or other object suitable for data storage and retrieval. In some cases, table 510 can be stored by a computer system separate from and accessible to computer server 102.

User id 212 and UA value 214 have been discussed above and can be taken from image submission 110. As shown, the same user id can be associated with multiple UA values. For example, a user with id001 in entries 515A, 515C, and 515F has used a SAMSUNG phone twice (entries 515A and 515C) and an IPHONE once (entry 515F). Accordingly, when a subsequent submission from user id id001 is made, the set of UA values that have been associated with this ID (entries 515A, 515C, and 515F) can be retrieved.

Timestamp 514 contains information about the time a given submission was made. Timestamp 514 may be sent by device 104 at the time of submission or collected by the server 102 at the time of the submission's receipt. Timestamps 514 can assist in modeling user activity through various means. For example, timestamps can determine a sequential chronological ordering of user agents of a given user and thus create a usage pattern for the user. As another example, timestamps 514 can be used to determine whether a user's frequency of accesses over given a time period is typical or not. (This type of information is referred to as burst information.)

Figure 5B:
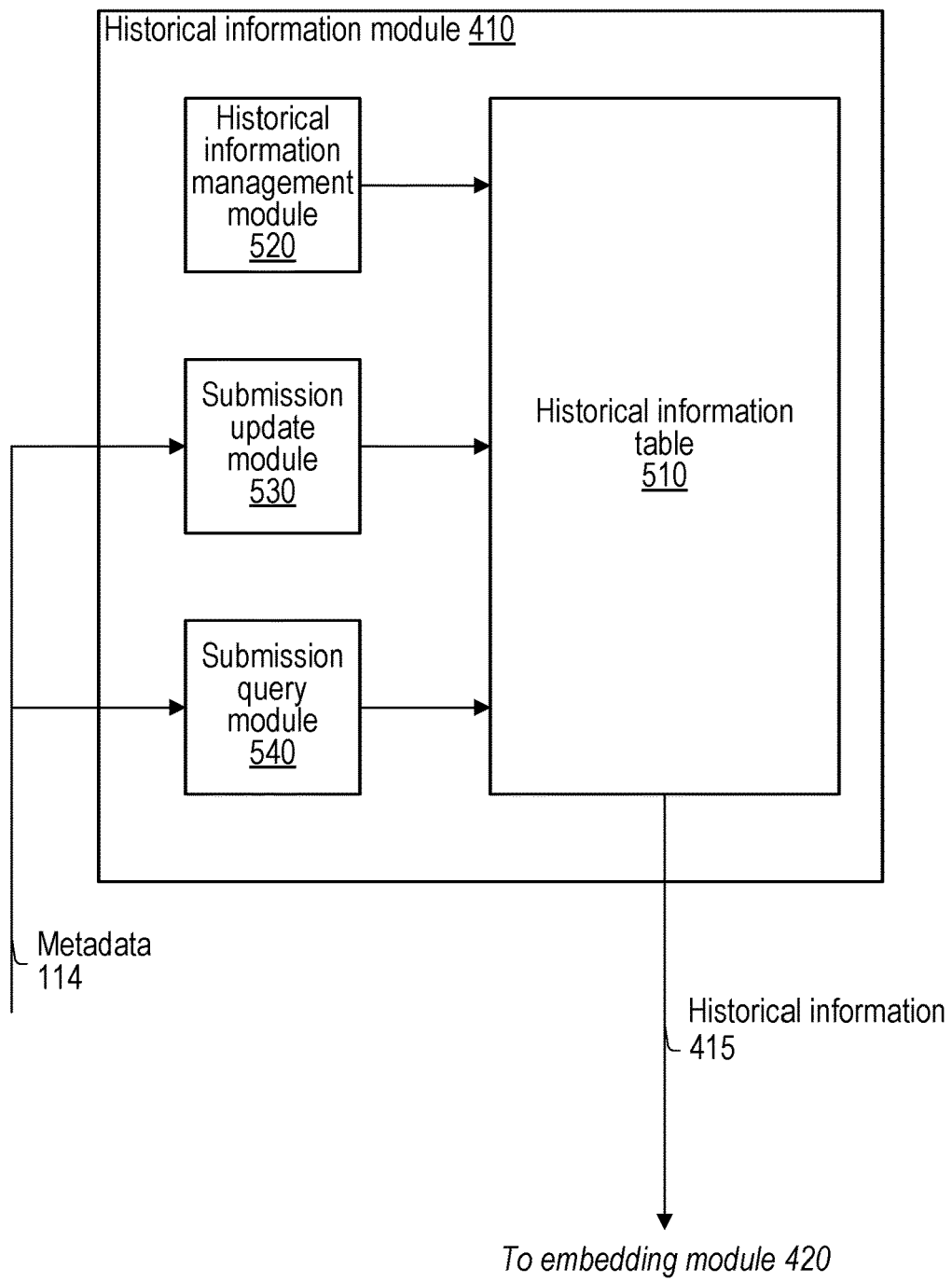
FIG. 5B is a block diagram illustrating further components in one embodiment of a historical information module.

FIG. 5B is a block diagram illustrating further components in one embodiment of a historical information module, which is part of image metadata analysis module 130. As shown, historical information module 410, which contains historical information table 510, a historical information management module 520, a submission update module 530, and a submission query module 540. Module 410 receives metadata 114 as input and produces historical information 415 as output.

When an image submission is received by server 102, metadata 114 is routed to module 410. In the depicted embodiment, metadata 114 is routed to both submission update module 530 and submission query module 540. Module 530 creates a new entry 515 within table 510 and inserts metadata 114 into appropriate fields within that entry. As discussed above, module 530 could either generate an appropriate timestamp 514 or use timestamp information included within submission 110. Metadata 114 can also be used by submission query module 540 to search table 510 for entries associated with metadata 114 and return the results as historical information 415. For example, module 540 may retrieve all entries associated with the user id portion of metadata 114.

Historical information management module 520 may be used in some embodiments to restrict table 510 to some specified period of time. Module 520 may thus operate periodically to remove entries from table 510 that are too old relative to some defined policy for table 510. Module 520 may have access to a current time value, and then evaluate given entries in table 510 according to their respective timestamps 514 to accomplish this removal operation.

Figure 6A:
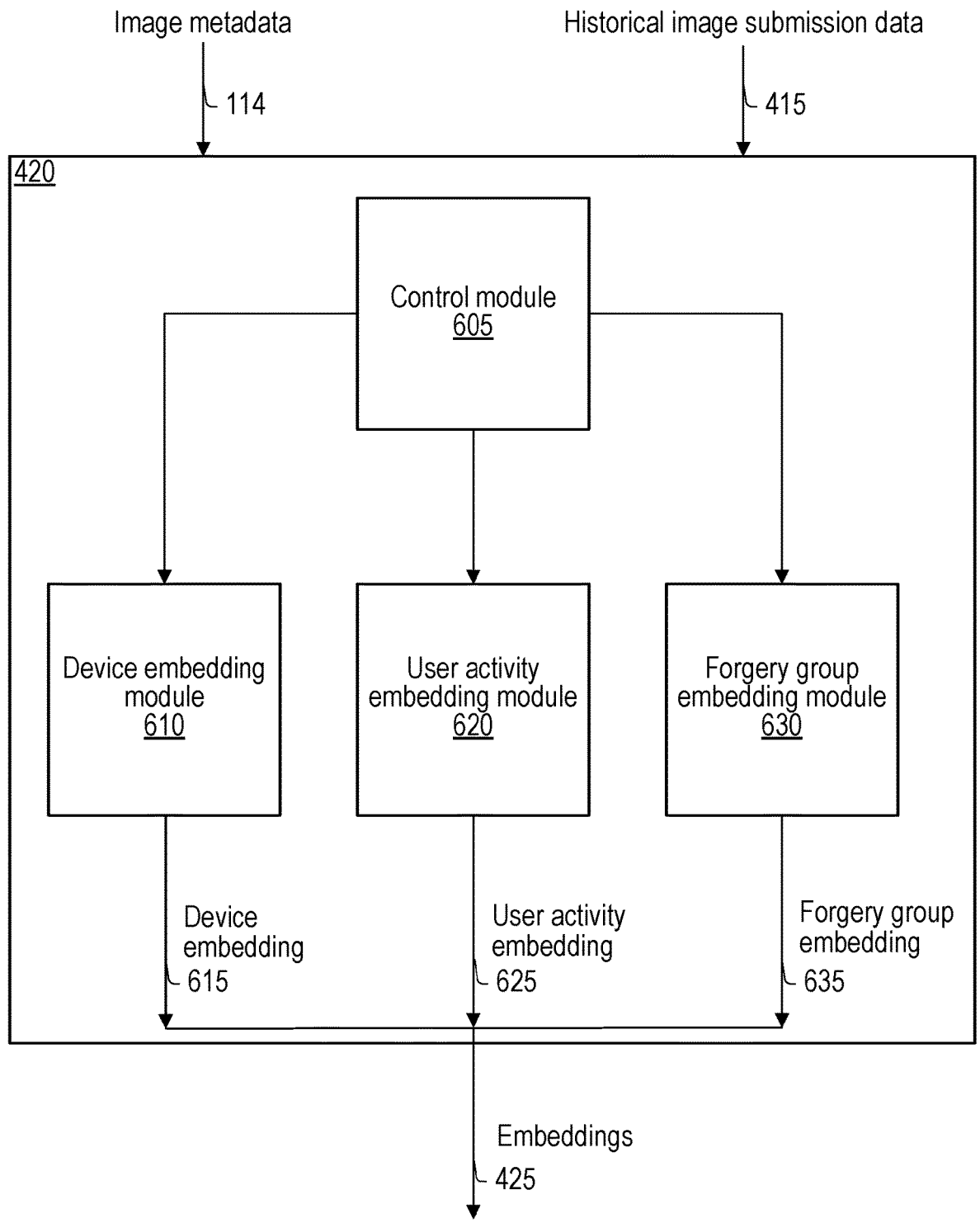
FIG. 6A is a block diagram of one embodiment of an embedding module.

FIG. 6A is a block diagram of one embodiment of an embedding module within system 100. As shown, embedding module 420 contains a device embedding module 610, a user activity embedding module 620, and a forgery group embedding module 630, which will be discussed in FIGS. 6B-D, respectively. In general, embedding module 420 produces a set of embeddings 425 from inputs (here, current image metadata 114 and historical information 415). Embeddings 425 are then provided to convolution model 430.

As will be described with respect to FIGS. 7A-C and FIG. 8, embedding module 420 may produce different numbers of embeddings 425 during training than it does during actual use. In one embodiment, during training, embedding module 420 produces three embeddings for a corresponding set of inputs: device embedding 615, user embedding 625 and forgery group embedding 635. During actual use (i.e., when making predictions after system 100 is trained), embedding module 420 may produce only user activity embedding 625. The number of outputs of embedding module 420 may be controlled by control module 605 in one embodiment based on whether system 100 is in training or deployment.

The embeddings are generated by module 420 using text embedding functions that take in User-Agent (UA) values as inputs. An example of a text embedding function is Word2Vec, which uses a neural network that can take in multiple string inputs and learn word associations from those strings. Word2Vec generates a vector (i.e., an embedding) that contains each word from the strings inputted to it. Once the vector is trained with multiple strings, it can be used to detect identical or similar strings. Other text embeddings functions such as fastText or GloVe may also be used.

Because text embedding functions can group similar or identical text strings, they are able to detect similarity between UA values. Thus, two inputs of the same IPHONE SAFARI UA value will have the same device embedding output, while embeddings of an IPHONE SAFARI UA value and an IPHONE FIREFOX UA value will have embeddings that are more similar to one another than an embedding of a WINDOWS PC UA value. Given a sequence of UA values that are submitted to a word embedding function, the output will be a vector containing information representative of those UA values. As has been discussed, because text embeddings are vectors (and thus numerical in nature), they are therefore capable of being used in other system components (e.g., convolution model 430) that rely on vector computation.

While three embedding modules are shown in FIG. 6A, more embeddings may be generated by module 420 in other embodiments. For example, an embedding may be generated for the geographical location of the submissions, which would for example derive a location from historical image submission data (e.g., via an IP address) and embed it into a vector.

Each of the embeddings 615, 625, and 635 that are produced by embedding module 420 represent different entities. Embedding 615 represents a device (using a User-Agent (UA) string value); embedding 625 represents activity of a particular user; and embedding 635 represents a set of forgery groups. But in order to infer the relationship between users and forgeries, each embedding is computed by embeddings of one or more UA values. Embedding 615 is an embedding of a UA value corresponding to a single device (e.g., a device associated with a particular training data submission). Embedding 625 represents user activity of a particular user by embedding UA values associated with the particular user (e.g., UA values with the user id of the particular user). Embedding 635 represents forgery groups by embedding UA values that have been found to submit forged images. This common use of UA values for embeddings 425 will allow convolution model 430 to learn relationships between user activity and forgeries via the common medium of device information (i.e., UA values).

Note that while historical data is helpful in modeling the behavior of bots, predictions can still be generated with incomplete, absent, or low-quality historical data or no historical data at all. For example, there are few user agents associated with newly created users, and thus no information exists regarding the user's status as a bot or the image submission hashing to a historical forgery group. While building accurate embeddings from that type of information is challenging, a large enough sample of incomplete submissions with completeness in various different types of information can help offset individual deficiencies. Using semi-supervised learning in some embodiments allows part of the inputs to be labeled and other parts to be unlabeled. Furthermore, as previously stated, machine learning models may even generate predictions without any historical information, as is the case with unsupervised learning, whereby none of the inputs are labeled. Missing data may be further remediated by, for example, initializing missing vectors or other inputs with values that are properly interpreted by machine learning algorithms as data that does not affect outputs, as is described for example with respect to FIG. 8. These will be them counterbalanced by other complete inputs.

Figure 6B:
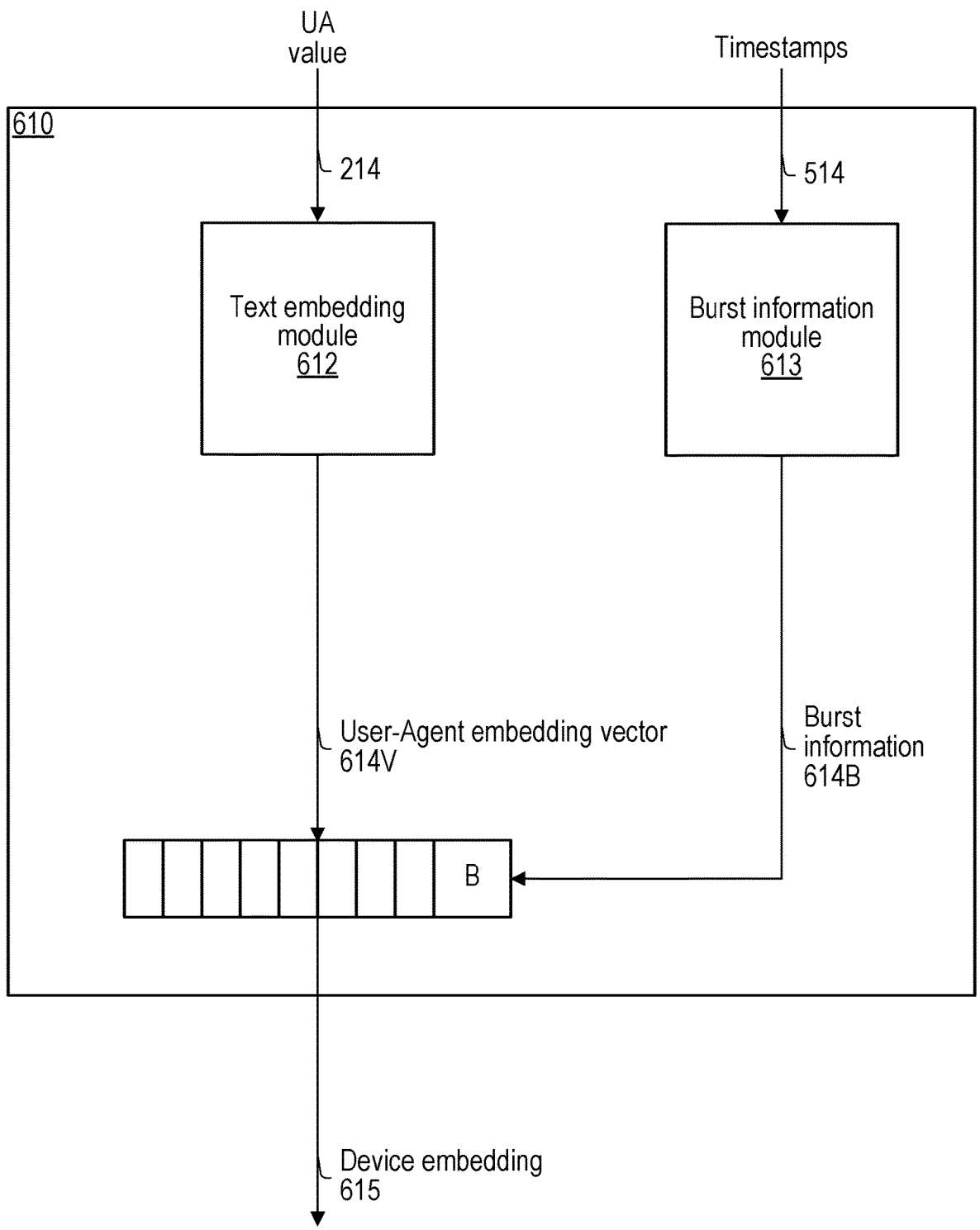
FIG. 6B is a block diagram of one embodiment of a device embedding module.

FIG. 6B is a block diagram of a device embedding module for embedding a User-Agent (UA) value. Device embedding module 610 receives a UA value 214 and outputs a device embedding 615. As further depicted, device embedding module 610 includes a text embedding module 612 and a burst information module 613. As noted above, device embedding module 610 is used only during training of system 100 in one embodiment.

Text embedding module 612 receives UA value 214 and embeds it using a text embedding function to output UA embedding vector 614V. For example, if the current UA value corresponds to an IPHONE SAFARI user agent, then embedding vector 614V will correspond to that specific UA value. In some embodiments, text embedding module 612 uses a fastText algorithm as its embedding function.

As shown, burst information module 613 may receive, in some embodiments, timestamps 514 of all submissions that share the same UA value, which it can then use to calculate submission frequencies and compute burst information 614B over one or more periods of time. Burst information is a measure of how abnormal the recent activity of a given user or user agent is. For example, if a user frequently submits one request a day, burst activity modeling would flag a particular day in which the user submits one hundred requests as being abnormally high. A burst value can be computed over a given time period (e.g., a day, a week, or a month) and multiple burst periods can be included in the same burst information 614B. During training, burst information 614B may be used as weights according to some embodiments: the higher the burst value is, the more likely it is that the user or user agent is behaving abnormally.

Burst information, according to one implementation, may be computed using the following formula $\text{softmax}(v_p)_i$, where a softmax( ) function is used to find the relative scale of entries of a vector $v_p$ containing the number of submissions over units of a given period p. For example, if the period is a month, $v_p$ will be of length 30 with each entry $v_p^i$ at i representing the number of submissions in a day, and the output of $\text{softmax}(v_p)_i$ is a vector containing values that describe how large each element of $v_p$ is relative to other elements of $v_p$. The larger $v_p$ is, the higher the burst value (i.e., the output of $\text{softmax}(v_p^i)$) will be for that particular time/entry. Other formulas that describe frequency or activity may also be used. Burst information 614B may, as shown, be concatenated to UA embedding vector 614V to generate device embedding 615.

Figure 6C:
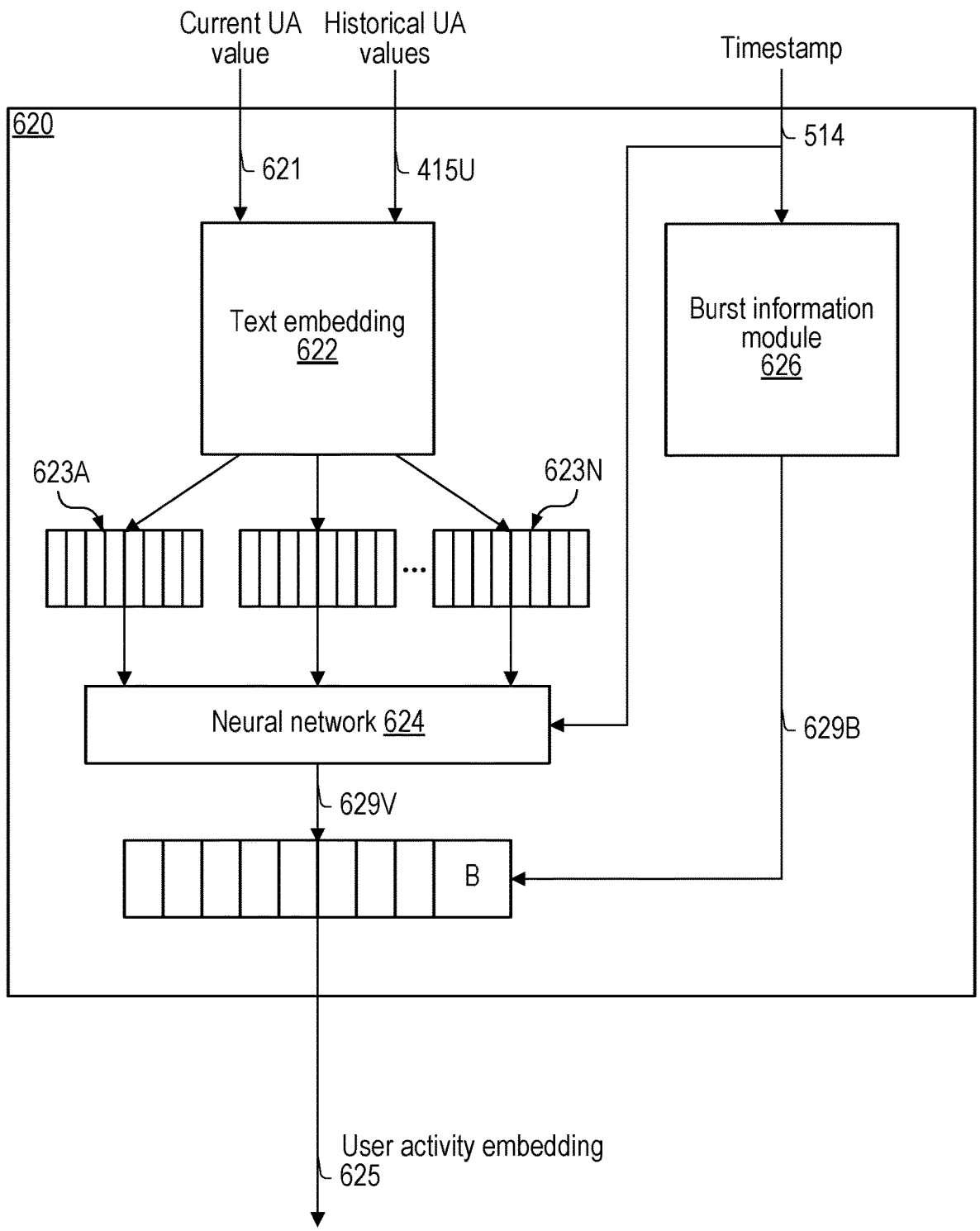
FIG. 6C is a block diagram of one embodiment of a user activity embedding module.

FIG. 6C is a block diagram of one embodiment of a user activity embedding module. User activity embedding module 620 contains a text embedding module 622, a neural network module 624, and optionally, a burst information module 626. Module 620 receives inputs indicative of one or more User-Agent (UA) values and generates a user activity embedding 625 therefrom. In some embodiments, module 620 is not used during the training process, but is instead used after deployment.

In one embodiment, user activity embedding module 620 receives current submission UA value 621 and historical UA values 415U. Both sets of values are linked to the current submission's user id—value 621 is the UA value for the current submission, while values 415U are the UA values for historical submissions associated by having the same user id as the current submission. In some embodiments, the inputs to module 620 may be the historical UA values and not the UA value for the current submission. Values 415U can be provided from historical information module 410 as described above.

Text embedding module 622 (which utilizes a fastText embedding function in one embodiment) then generates a UA vector 623 for each received UA value. Neural network 624 (implementing a long short-term memory (LSTM) model in one embodiment) then uses timestamps 514 associated with the UA values to generate a sequence of UA values with a specific ordering in order to represent a user's recent activities. Long Short-Term Memory (LSTM) networks are one type of neural network that is capable of encoding sequential information for non-textual data. The output of neural network 624 is vector 629V.

Optional burst information module 626 is similar to burst module 613 described above, but it computes, using timestamps 514, burst activity for the user id associated with the current submission. If burst information module 626 is used, its output, 629B, is concatenated with vector 629V to output user activity embedding 625. If burst information module 626 is not used, only vector 629V is output as user activity embedding 625.

Figure 6D:
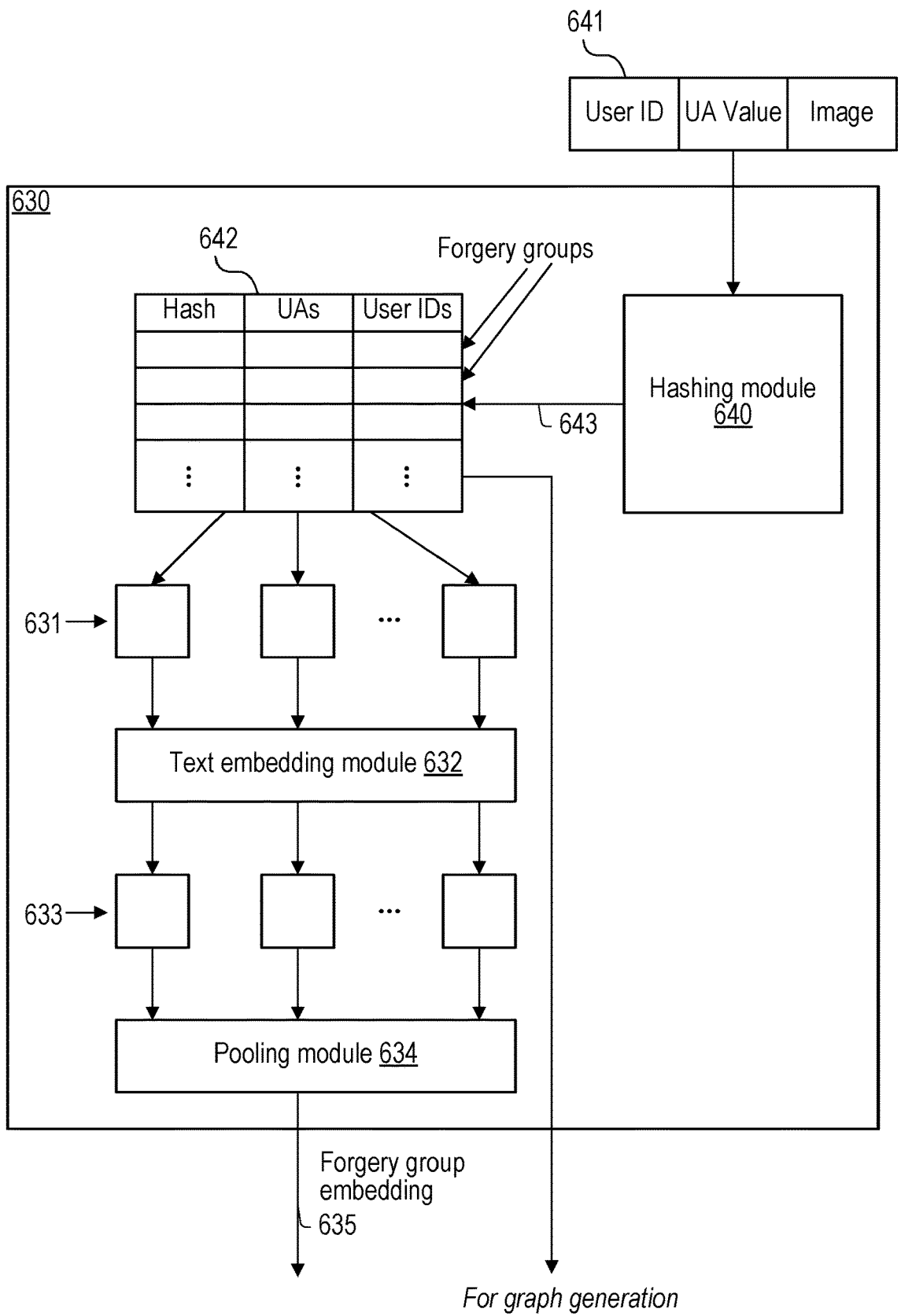
FIG. 6D is a block diagram of one embodiment of a forgery group embedding module.

FIG. 6D is a block diagram of one embodiment of a forgery group (FG) embedding module. As shown, FG embedding module 630 includes a hashing module 640, a hashing data store 642, a text embedding module 632, and a pooling module 634. FG embedding module 630 receives training submissions and outputs an FG embedding 635. As noted above, module 630 is used only during training of system 100. More specifically, module 630 is used during a preprocessing phase (as will be described with respect to FIG. 7A) to compute an initial forgery group embedding 635 prior to training of convolution model 430.

During the preprocessing phase, FG embedding module 630 receives a series of training data submissions 641, each of which includes various types of information, such as an image and a corresponding User-Agent (UA) value. In some embodiments, each training data submission 641 also includes a user id. Each submission is provided to hashing module 640, which performs a hash of the image. In one embodiment, the hash is an MD5 hash, but any suitable hashing algorithm may be used. The resulting hash value 643 is supplied to hashing data store 642.

In one embodiment, data store 642 is a hash table whose buckets are capable of containing multiple UA values (and in some cases, corresponding user ids). If hash value 643 is not currently stored in data store 642, an entry is added that includes hash value 643 and the UA value for the current submission 641. If hash value 643 is currently stored in data store 642, then the UA value for the current submission 641 is added to the entry for the matching hash value.

In some cases, various submissions 641 may not include images, such as in the case of non-fraudulent submissions. In some implementations, these submissions may be handled by generating a dummy hash along with setting a bit indicating that the entry does not correspond to a forgery group. The dummy hash may then be stored along with the UA value and the user id in data store 642. As will be described with respect to FIG. 7A, this information can be useful in generating a graph indicative of relationships between UA values and forgery groups.

After all submissions 641 are processed, various entries in data store 642 will correspond to a forgery group, which is associated with all UA values that submitted a particular forged image. As noted, in some cases, certain entries in data store 642 may correspond to submissions without images. At this point, information in data store 642 can also be used for graph generation during a preprocessing phase, as will be described with respect to FIG. 7A.

After traversal of the training data is complete, the UA values for each entry in data store 642 (or only those entries having corresponding images) are output as respective text strings 631, each of which includes all UAs associated with a specific forgery attack. Strings 631 are supplied to text embedding module 632, which outputs embedding vectors 633. Embedding vectors 633 are then sent to pooling module 634, which in one embodiment executes a function (e.g., a mean value function) to compute an initial FG embedding 635. As will be described with respect to FIGS. 7A-B, embedding 635 may be used at the outset of the training of convolution model 430 to provide an initial value of $E_f^0$. FG embedding 635 can be thought of as a proxy for the "typical" attacker, as it contains information that is pooled from a set of historical forgery submitters.

The inventors have realized that it can be difficult to immediately infer any relationships between users and forgery attacks. First, relationships between users and forgery groups are not always explicit. For example, new users are not associated a priori with any forgery group as their submissions are unknown. Second, embeddings such as 615, 625, and 635 are directed to disparate quantities independent of the other embeddings. (Embeddings 615 are directed to devices, embeddings 625 are directed to user activity, and embedding 635 is directed to forgery groups.) As has been noted, the inventors propose finding correlations between users and forgery groups using their respective initialized embeddings. To accomplish this, the inventors propose to correlate user activity (i.e., a user) and devices, and to correlate devices and forgery groups. This approach, which can be termed a "tripartite representation," has the effect of correlating users (user activity) and forgery groups—via the common representation of devices, which are expressed as UA values.

Preprocessing Stage

Figure 7A:
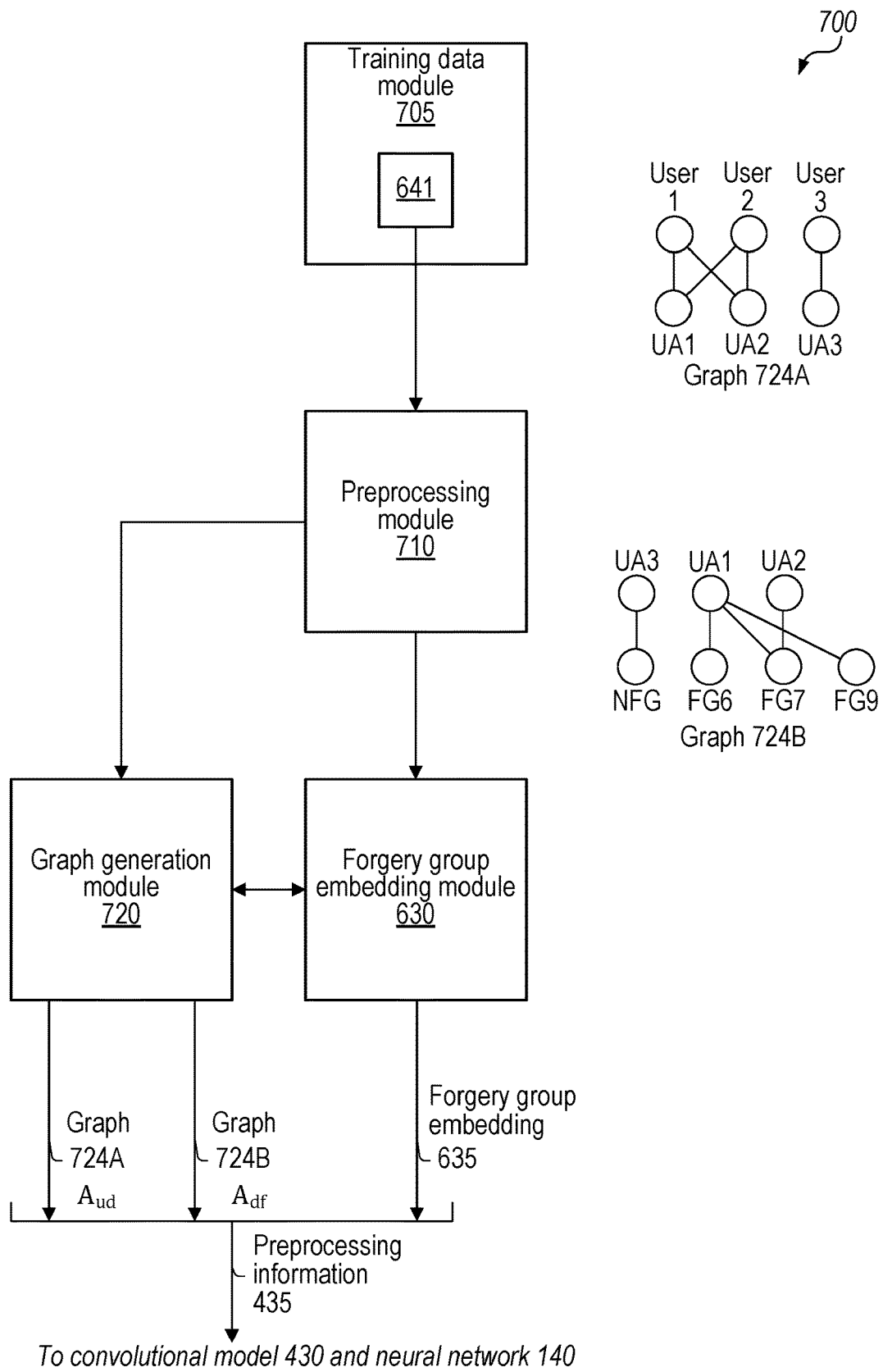
FIG. 7A is a block diagram of one embodiment of modules for preprocessing data prior to training of a machine learning model.

FIG. 7A is a block diagram of one embodiment of modules for preprocessing data to generate preprocessing information 435 before system 100 is trained and ultimately deployed. As shown, block diagram 700 includes a set of training data 705, a preprocessing module 710, a graph generation module 720, and forgery group embedding module 630. As will be described, modules 710, 720, and 630 operate on training data 705 to generate graphs 724A-B (also referred to as $A_{ud}$ and $A_{dr}$, respectively) and forgery group embedding 635.

Preprocessing module 710 directs operations that initialize certain values so that system 100 can subsequently be trained (as described with respect to FIG. 7B) and ultimately used in practice (as described with respect to FIG. 8). Training data 705 includes a set of submissions. Each submission 641 includes, in some embodiments, a user id, a User-Agent (UA) value, and an associated image, but more metadata may be included in each submission in other implementations. Training data 705 may also include information as to whether each submission is fraudulent or not (e.g., labels).

In some embodiments, preprocessing module 710 can feed each submission 641 in training data 705 to both graph generation module 720 and forgery group embedding module 630. Graph generation module builds two types of graphs. Graph 724A represents relationships between users and corresponding UA values. In the excerpt of graph 724A shown in FIG. 7A, user 1 and user 2 have each made submissions using UA1 and UA2, while user 3 has made a submission using UA3. Graph 724B, on the other hand, represents relationships between UA values and forgery groups. As shown, UA1 is associated with forgery groups 6, 7, and 9; UA2 is associated with FG 7; and UA3 is not associated with any FG.

Graph 724A can be built iteratively by graph generation module 720. When a first submission 641 is received by module 720, an entry in graph 724A can be added, linking the user id and the UA value in that submission 641. After all submissions in training data 705 are processed, graph 724A will be complete.

Graph 724B, on the other hand, can be built in one embodiment by leveraging the work of forgery group embedding module 630. As described above with respect to FIG. 6D, data store 642 can store information about forgery groups and associated UA values. Once all submissions 641 have been processed by module 630, the information in data store 642 can be provided to graph generation module 720. Graph generation module 720 can then traverse each entry corresponding to a forgery group. For example, the first entry in data store 642 might be assigned to forgery group 1. An entry for FG 6 might be established in graph 724B and then linked to all UA values listed in the first entry. In some cases, there may be some UA values (e.g., UA 3) not linked to a forgery group. As shown, a "non-forgery" entry NFG may be inserted in graph 724B and linked to all UA values without a forgery group associated with them. UAs that are not involved in any forgery group can then be learnt together with other forgery groups. A sample of the resulting graph 724B (showing FGs 6, 7, and 9) is shown in FIG. 7A. Of course, graph 724B may be built in any suitable manner.

There are multiple ways to represent graphs 724A-B: in some embodiments, the graphs are adjacency matrices, but in other embodiments, they are adjacency lists. Numerically, each node of graphs 724, in some embodiments, represents an entity (user, UA, or FG) and the weight of each edge may represent the number of associated submissions (between a certain User and UA in 724A, and between a UA and an FG in 724B. For example, if two separate submissions were made by the same user id with the same UA value, they could both be represented in the adjacency matrix of graph 724A as edges of weight 2 that link the user id node to each respective UA node. Edge weights can thus be used to help qualify the strength of a relationship between two particular entities during further analysis.

The operation of module 630, which produces FG embedding 635 ($E_f^0$) has already been described with respect to FIG. 6D. FG Embedding 635 and graphs 724A-B thus represent preprocessing information 435 for convolution model 430. With preprocessing complete, system 100 can now be trained, as described next.

Figure 7B:
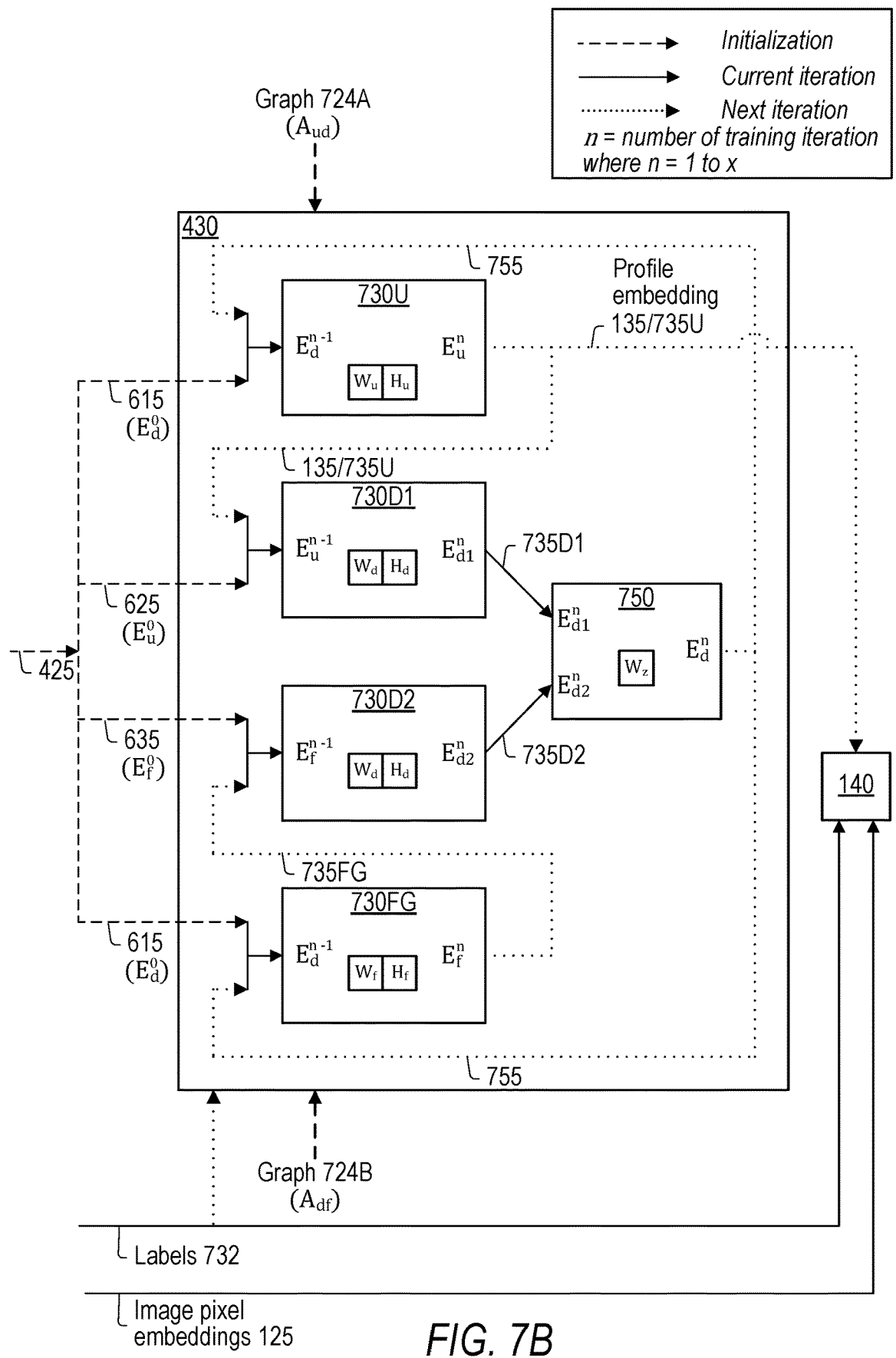
FIG. 7B is a block diagram of one embodiment of training of a convolution model.

FIG. 7B is a block diagram of one embodiment of a convolution model that illustrates a training process. The operations of convolution model 430 are depicted in different phases: initialization (dashed), current iteration (solid), and next iteration (dotted). Initialization is associated with only to the first of x training iterations (i.e., n=1, where n represents the number of the current iteration).

As depicted in FIG. 7B, model 430 includes convolution operation modules 730U, 730FG, 730D1, and 730D2. The nomenclature for modules 730 is based on the type of output that is produced. Module 730U produces a user activity (U) embedding such as was described with respect to module 620; modules 730D1 and 730D2 produce portions of a device (D) embedding such as was described with respect to module 610; and module 730FG produces a forgery group (FG) embedding such as was described with respect to module 630. Model 430 also includes an aggregation module 750.

Inputs to each convolution operation module 730 will depend on the iteration, as will be discussed in more detail below. For the first iteration, inputs to modules 730U, 730D1, 730D2, and 730FG are initialized using various ones of embeddings 425. Inputs to modules 730 for successive iterations are provided from the outputs of other modules within model 430 as described below.

During training, convolution operation modules 730 receive initialized embeddings 425 and produce updated versions of these embeddings while continuously updating parameters that include weights $W_d$, $W_f$, and $W_u$ and biases $H_d$, $H_f$, and $H_u$. (These parameters are thus learned by model 430.) As training progresses through various iterations, convolution model 430 in effect stores information in those learned parameters, which thus act as a "memory" of user agents that have participated in forgery attacks. When training concludes, these learned parameters are now persistently embedded into model 430. These learned parameters can help during both training and prediction (i.e., actual use after deployment).

Training—Initialization

To supply starting values for iteration n=1, convolution model 430 receives, as inputs represented as dashed lines, initialized embeddings 425 that include initial device embedding 615 ($E_d^0$), initial user activity embedding 625 ($E_u^0$), and initial forgery group embedding 635 ($E_f^0$). These embeddings have been computed as described with respect to FIGS. 6B-D and 7A. In some embodiments, model 430 receives embeddings 425 from embedding module 420. Versions of those inputs are then updated in successive training iterations, according to some embodiments.

Graphs 724 are also available to model 430 and contain historical information about all entities involved in training. For example, graph 724A ($A_{ud}$) contains information representing user-device relationships for a training data set. Graph 724B ($A_{df}$), on the other hand, contains information representing device-forgery group relationships for the training data set.

Labels 732 are input into model 430 to distinguish between submissions that are involved in forgery groups and submissions that are not. In some embodiments, labels 732 are implicit and inferred from either initial embeddings or graphs. For example, graph 724A may implicitly label its data by using negative values as indicators that individual submissions are not fraudulent, and positive values to denote the opposite. But in other embodiments, labels are submitted directly to the module as separate values. In either case, labels 732 affect the values of weights and biases of modules 730 by biasing those weights towards values/user-agents that are more correlated to forgery groups.

Before describing the training of model 430, it will be instructive to describe the operation of the four types of convolution modules 730, as well as the operation of module 750. Each module performs a different type of operation and updates various learned parameters.

In one embodiment, module 730U performs the following operation:

$$E_u^n = Relu(A_{ud} E_d^{n-1} W_u) + H_u. \qquad \text{(operation 1)}$$

The inputs to operation 1 are graph 724A ($A_{ud}$), as well as the value $E_d^{n-1}$, which is the device embedding from the previous iteration (n is the current iteration, and n−1 is the previous iteration in this nomenclature.) The output of operation 1 is thus $E_u^n$, also referred to as 735U (which is analogous to profile embedding 135 described above), which is a user activity embedding for the current iteration. A given instance of operation 1 includes generating 735U by multiplying $E_d^{n-1}$ and graph 724A, which includes linkages between users and UA values, such that user activity embedding 735U includes information from all users that have used the user agent described by embedding 615. Module 730U also performs a rectified linear activation function (Relu), which in one embodiment is a piecewise linear function that will output the input directly if it is positive; otherwise, it will output zero. (This function is commonly used in machine learning models.) Module 730U also updates parameters $W_u$, $H_u$.

In one embodiment, module 730FG performs the following operation:

$$E_f^n = Relu(A_{df} E_d^{n-1} W_f) + H_f. \qquad \text{(operation 2)}$$

The inputs to operation 2 are graph 724B ($A_{df}$), as well as the value $E_d^{n-1}$, which is also supplied to module 730U and is the device embedding from the previous iteration. The output of operation 2 is $E_f^n$, also referred to as 735FG, which is a forgery group embedding for the current iteration. A given instance of operation 2 generates 735FG by multiplying $E_d^{n-1}$ and graph 724B, which includes linkages between UA values and forgery groups, such that forgery group embedding 735FG includes information from all UAs that have been associated with forgery groups. Module 730FG also performs a rectified linear activation function similar to module 730U. Module 730FG also updates parameters $W_f$, $H_f$.

In one embodiment, convolution operation module 730D1 performs the following operation:

$$E_{d1}^n = Relu(A_{ud} E_u^{n-1} W_d) + H_d. \qquad \text{(operation 3)}$$

The inputs to operation 3 are graph 724A ($A_{ud}$), as well as the value $E_u^{n-1}$, which is the user activity embedding from the previous iteration. Performing operation 3, which again includes a graph multiplication and a rectified linear activation function, allows the device embedding portion 735D1 to receive information propagated from user activity. The output of operation 3 is $E_{d1}^n$, also referred to as device embedding portion 735D1. Module 730D1 also updates parameters $W_d$, $H_d$ in each training iteration.

In a parallel branch of model 430, convolution operation module 730D2 performs the following operation in one embodiment:

$$E_{d2}^n = Relu(A_{df}E_f^{n-1}W_d) + H_d. \quad \text{(operation 4)}$$

The inputs to operation 4 are graph 724B ($A_{df}$), as well as the value $E_f^{n-1}$, which is the forgery group embedding from the previous iteration. Performing operation 4, which again includes a graph multiplication and a rectified linear activation function, allows the device embedding portion 735D2 to receive information propagated from forgery groups. The output of operation 4 is $E_{d2}^n$, also referred to as device embedding portion 735D2. Module 730D2 also updates parameters $W_d$, $H_d$ in each training iteration.

As depicted, aggregation module 750 receives device embedding portions 735D1 and 735D2. In one embodiment, module 750 performs the following operation:

$$E_d^n = (E_{d1}^n + E_{d2}^n)W_z. \quad \text{(operation 5)}$$

Recall that portion 735D1 includes information propagated from user activity, while portion 735D2 includes information propagated from forgery groups. Accordingly, operation 4 outputs an updated device embedding 755 that includes information from both user activity and forgery groups. Weight $W_z$ is also updated during operation 5.

Now that the functions of the components of model 430 have been described according to one embodiment, an embodiment of the actual training process can be explained.
Training—Iterations 1 to x In general, each of convolution operation modules 730 utilizes an input from a previous iteration (denoted by a superscript n−1) to generate an input for a current iteration (denoted by a superscript n). As has been noted, in the context of FIG. 7B, n is used as a variable to denote the number of the current training iteration. There are a total of x iterations; the first iteration is iteration 1 (i.e., n=1) and the last iteration is iteration x (n=x).

Since n is equal to 1 for the first iteration, n−1 is equal to 0. Accordingly, prior to iteration 1, a set of initial embeddings are supplied as inputs to modules 730:

$E_d^{n-1}$ in modules 730U and 730FG is initialized using $E_d^0$;
$E_u^{n-1}$ in module 730D1 is initialized using $E_u^0$; and
$E_f^{n-1}$ in module 730D2 is initialized using $E_f^0$;

After these initializations are made, model 430 performs iteration 1, in which each of modules 730 and 750 produces a corresponding set of outputs:

Module 730D1 produces $E_{d1}^1$ (735D1) from input $E_u^0$;
Module 730D2 produces $E_{d2}^1$ (735D2) from input $E_f^0$;
Module 750 produces $E_d^1$ (755) from inputs $E_{d1}^1$ and $E_{d2}^1$;
Module 730U produces $E_u^1$ (735U or profile embedding) from input $E_d^0$ and
Module 730FG produces $E_f^1$ (735FG) from input $E_d^0$.

Note that the outputs of modules 730D1, 730D2, and 750 are considered to produce the output of this iteration (i.e., $E_d^1$ (755)), while the outputs of modules 730U and 730FG are instead used in the next iteration.

At the conclusion of iteration 1, the outputs of various modules 730 are thus supplied to the inputs of other modules 730 to prepare for iteration 2. More specifically:

Module 730D1 receives $E_u^1$, which is output from module 730U in iteration 1;
Module 730D2 receives $E_f^1$, which is output from module 730FG in iteration 1; and
Modules 730U and 730FG receive $E_d^1$, which is output from module 750 in iteration 1.

Model 430 then performs iteration 2, in which each of modules 730 and 750 produces a corresponding set of outputs:

Module 730D1 produces $E_{d1}^2$ from input $E_u^1$;
Module 730D2 produces $E_{d2}^2$ from input $E_f^1$;
Module 750 produces $E_d^2$ from inputs $E_{d1}^2$ and $E_{d2}^2$;
Module 730U produces $E_u^2$ from input $E_d^1$; and
Module 730FG produces $E_f^2$ from input $E_d^1$.

At the conclusion of iteration 2, the outputs of various modules 730 are again supplied to the inputs of other modules 730 to prepare for iteration 3. More specifically:

Module 730D1 receives $E_u^2$, which is output from module 730U in iteration 2;
Module 730D2 receives $E_f^2$, which is output from module 730FG in iteration 2; and
Modules 730U and 730FG receive $E_d^2$, which is output from module 750 in iteration 2.

This process repeats until x training iterations are performed. The value of x is a design choice and may be based on how well model 430 has been trained based on the labeled data. At the end of training (i.e., after iteration x), model 430 will contain relationship information between users and forgery groups. The tuned user activity embedding 735U/135 can then be used to train neural network 140, which is the classifier of system 100 that ultimately makes a prediction of whether an image is a forgery. Classifier 140 has access to the tuned user activity embedding, as well as the image pixel embeddings and labels 732. Neural network 140 can use the received inputs to perform its training process, according to known techniques. Neural network 140 is thus able to learn which tuned profile embeddings and image embeddings are correlated with forgery, enabling neural network 140 to generate forgery predictions for an image submission whose authenticity is unknown. In one embodiment, training is complete after iterating through all submissions in training data 705. Trained convolution model 430 and neural network 140 can now be deployed with their learned parameters, as will be discussed with respect to FIG. 8.

Convolution model 430 thus relates three types of data: user activity (i.e., activity by a particular user, such as embedding 625), device data (for which the UA value for the current submission is used as a proxy—e.g., embedding 615), and forgery groups (e.g., embedding 635). Accordingly, model 430 can be said to constitute a tripartite representation of data. In order to relate a particular user to a forgery group, all three types of data can be represented using device data (i.e., UA values). That is, a user's activity can be represented by the set of UA values associated with the user. Similarly, an FG can be represented by the set of UA values that have been used for forgery attacks. This criterion ensures that information can be propagated from one type of data to another.

Convolution model 430 thus learns relationships (i.e., performs relationship convolution learning) between user activity and devices, and between devices and forgery groups. As noted above, different learnable parameters and convolutions are used to learn these distinct relationships. Therefore, despite the user activity and forgery group entities initially not interacting directly, model 430 is operable to incorporate information from each data type with one another through the medium of device information. This relationship is accomplished by model 430 using two different types of information convolution: convolution between user activity and devices, and convolution between forgery groups and devices.

Deployment

Figure 8:
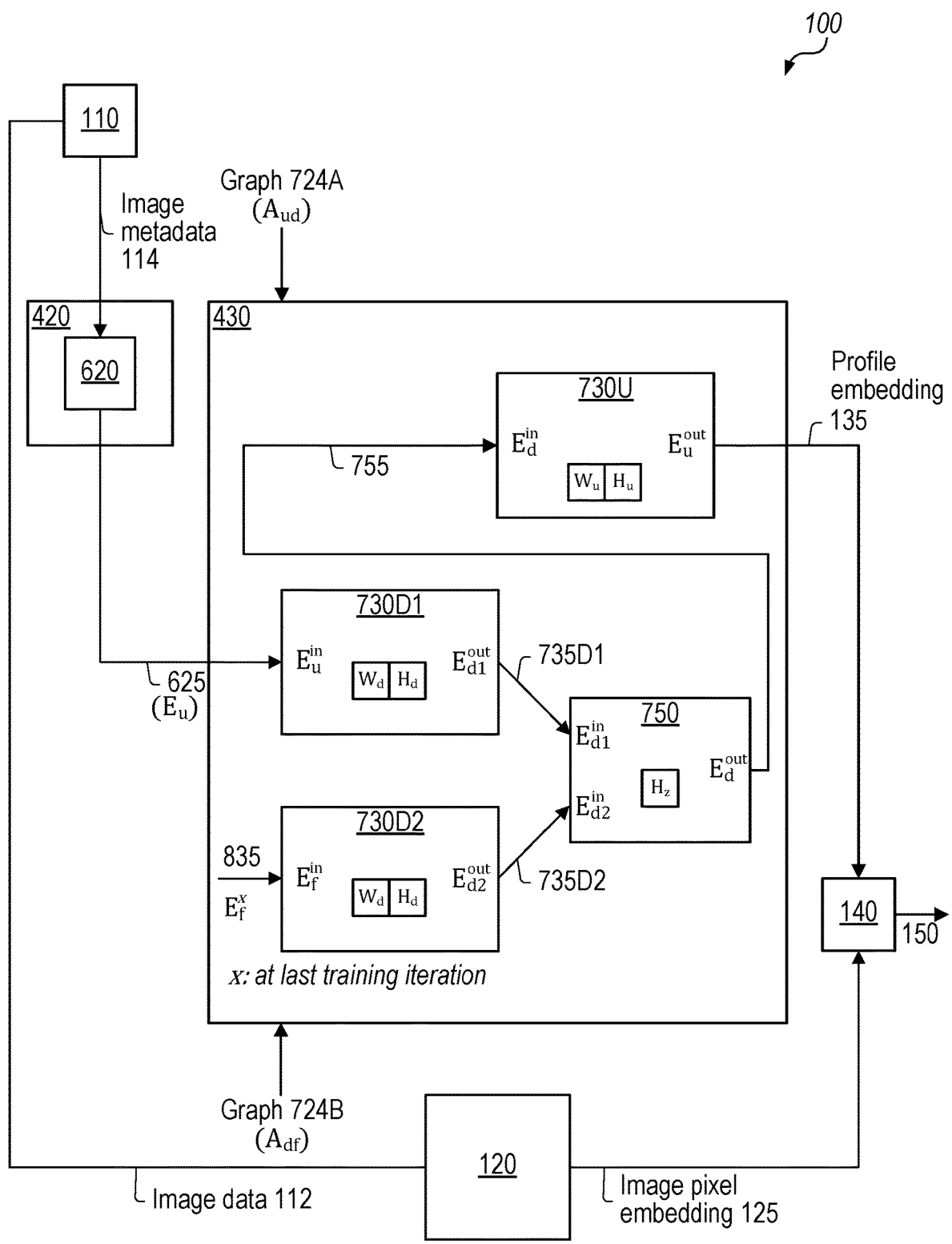
FIG. 8 is a block diagram illustrating one embodiment of a deployed forgery prediction system.

FIG. 8 is a block diagram 800 illustrating one embodiment of using system 100 to perform a forgery prediction after training—that is, during deployment of the trained system 100. As shown, image data 112 and image metadata 114 from submission 110 are supplied to image analysis module 120 and image metadata analysis module 130, respectively. (While module 130 is not depicted specifically in FIG. 8, recall that module 130 includes both embedding module 420 and convolution model 430.) Module 120 outputs image pixel embedding 125 from image data 112. Concurrently, user activity embedding module 620 within module 420 generates user activity embedding 625 for the current submission 110, also denoted as $E_u$. With embedding 625 as an input, convolution model 430 generates $E_u^{out}$, also referred to as profile embedding 135 for submission 110. Embeddings 125 and 135 are then used by neural network 140, which has been trained as described above with respect to FIG. 7B, to generate forgery prediction 150 for submission 110.

The goal of convolution model 430 during deployment is to associate user activity information of the current submission's user with forgery group information. As has been noted, this is done by model 430 relating user activity information to device information, and device information to forgery group information. Accordingly, model 430 receives a "raw" user activity embedding 620 as input and outputs profile embedding 135, which is a "tuned" or "refined" version of embedding 620. Profile embedding is refined relative to embedding 625 because it is now associated with forgery group information via device information.

During deployment, convolution operation modules 730D1 and 730D2 work in a manner similar to that described above with respect to FIG. 7B. Module 730D1 receives user activity embedding 620, which varies from submission to submission. Module 730D1 performs operation 3 to generate device embedding portion 735D1 ($E_{d1}^{out}$), which inherits information from user activity embeddings and historical forgery group embeddings via learned parameters $W_d$ and $H_d$. Portion 735D1 is then provided to aggregation module 750.

Module 730D2, on the other hand, receives forgery group embedding 835 ($E_f^x$), which is the forgery group embedding generated during the last training iteration x. Note that embedding 835 will not change from submission to submission in this embodiment. Module 730D2 performs operation 4 to generate device embedding portion 735D2 ($E_{d2}^{out}$). Portion 735D2 also inherits information from user activity embeddings and historical forgery groups via its learned parameters $W_d$ and $H_d$. Portion 735D2 is then provided to aggregation module 750. When predicting a new submission, if the particular UAs of the submission have historically been involved in any previous forgery group, then those UAs will be linked to those existing forgery groups of $E_f^x$. Otherwise, the User-Agents of the submission will be linked to the "not forgery" group (e.g., the NFG node of Graph 724B, not shown) of $E_f^x$.

Aggregation module 750 outputs, based on device embedding portions 735, device embedding 755 ($E_d^{out}$), which inherits information from past device embeddings used during training via parameter $W_z$, user information from current user embedding 625, and forgery group information from forgery group embedding 835. Device embedding 755 is then provided to convolution operation module 730U to output profile embedding 135, which, as noted, is a tuned user activity embedding that now includes information from parameters $W_d$, $H_d$, $W_u$, $H_u$, and $W_z$ in addition to historical forgery group embedding 835. Thus, the activity of the user associated with the current submission has been imbued with information relating to forgery groups, via the common specification of device information.

As noted, both profile embedding 135 and image embedding 125 are input into trained neural network 140 for a forgery prediction 150. This approach is designed to yield a more accurate forgery determination, as compared to approaches that rely on only image analysis or less sophisticated machine learning techniques. Note that in some cases, model 430 can be further trained during deployment.

The foregoing discussion of embodiments has focused on image forgery detection. But it is to be understood that the disclosed techniques can be extended to analyses beyond image forgery. More broadly, these techniques can be extended to various types of digital data submissions.

Figure 9:
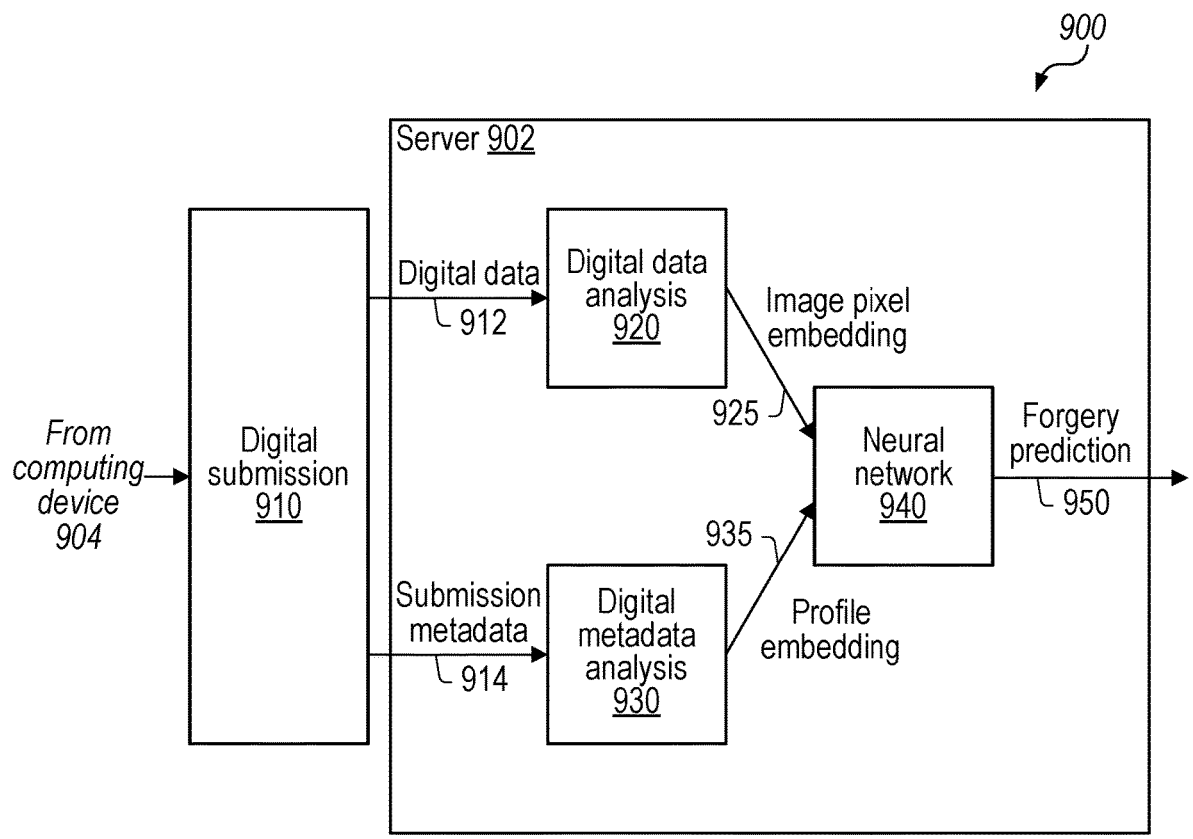
FIG. 9 is a block diagram of one embodiment of a system for analysis of a digital data submission.

FIG. 9 is a block diagram illustrating one embodiment of a system for analyzing a digital data submission. As can be seen, FIG. 9 includes elements that are very similar to those shown in FIG. 1. System 900 includes server 902, which receives digital submission 910 and includes digital data analysis module 920, digital metadata analysis module 930, and neural network 940.

Digital submission 910 might, for example, be a post made by a user in an online forum, according to some embodiments. In such cases, the text of the post itself (i.e., digital data 912) will be analyzed by digital data analysis module 920, while post metadata (i.e., submission metadata 914)—such as User-Agents of the device the post was submitted from—will be analyzed by digital data metadata analysis module 930. A prediction 950 can be then generated by neural network 940 to determine whether the post being submitted is spam.

System 900 receives a digital submission 910 from computing device 904. The digital submission includes digital data 912, as well as associated submission metadata 914. Digital data 912 (the data itself) is provided to module 920, while submission metadata 914 (data that may relate to one or more of 904, 910, or 912) is provided to module 930. In a manner similar to image pixel embedding module 120 (as shown in FIG. 3), some form of analysis is performed on the digital data itself in module 920. Similarly, an analysis of the metadata 914 accompanying the submission 912 is performed by module 930. In some embodiments, this metadata analysis may involve machine learning using techniques similar to those described above with respect to image forgery detection. Digital data analysis module 920 can output a digital data embedding value 925 that is analogous to image pixel embedding 125. Similarly, digital data metadata analysis module 930 can output a profile embedding 935 that is analogous to profile embedding 135 discussed above. Embeddings 925 and 935 can thus be supplied to a neural network 940 which can make a prediction 950 that relates to the digital data submission.

In one embodiment, prediction 950 is a security prediction, and thus may predict whether the digital data in submission 910 is legitimate. The digital data can be any type of data including text, video, audio, etc. Submission 910 can be made for any person, including, but not limited to, authentication. For example, submission 912 in submission 910 might include biometric data, such as fingerprints or iris scans. This data, like any other type of digital data, is susceptible to forgery. System 900 can work in a manner analogous to system 100 to detect such forgery.

FIG. 9 thus illustrates that techniques of the present disclosure are not limited to image forgery analysis. Instead, such techniques can be broadened to any suitable type of digital data analysis.

Example Methods

Figure 10A:
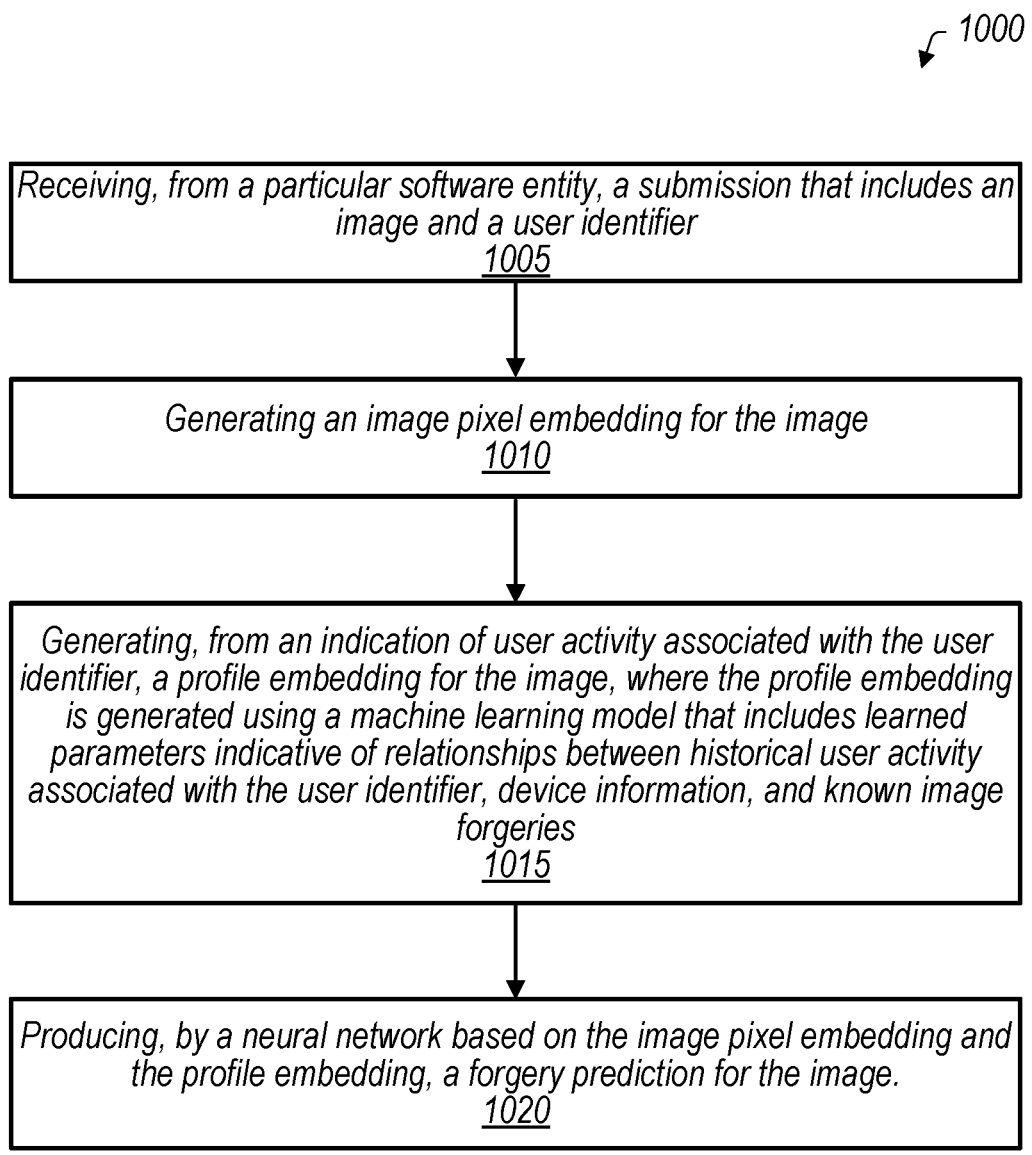
FIG. 10A is a flow diagram of one embodiment of a method for image forgery analysis.

FIG. 10A is a flow diagram of one embodiment of a method for making an image forgery prediction. In one embodiment, method 1000 is performed by a computer server such as server 102. Method 1000 can be performed for any suitable purpose, such as authentication for an Internet service.

Method 1000 begins in 1005, in which a computer system receives, from a particular software entity, a submission (e.g., submission 110) that includes an image (e.g., image 112) and a user identifier (e.g., user id 212). Other metadata in addition to the user identifier may also be included in the submission. In 1010, an image pixel embedding (e.g., image pixel embedding 125) is generated for the image (e.g., by image analysis module 120).

Method 1000 continues in 1015, in which a profile embedding for the image is generated (e.g., by image metadata analysis module 130). The profile embedding (e.g., profile embedding 135) is generated from an indication of user activity associated with the user identifier (e.g., user activity embedding 625). The profile embedding is generated using a machine learning model (e.g., convolution module 130) that includes learned parameters (e.g., weights $W_d$, $W_u$, and $W_z$ and biases $H_d$, $H_f$, and $H_u$) indicative of relationships between historical user activity associated with the user identifier, device information, and known image forgeries.

In some implementations, the learned parameters of the machine learning model have been determined using information convolution between 1) user activity information and device information, and between 2) forgery group information and device information. Further, the information convolution between user activity information and device information may include 1) propagating information that relates forgery group information and device information into user activity information, and 2) propagating user activity information into device information. The information convolution between forgery group information and device information, on the other hand, may include 1) propagating information from each forgery group to devices associated with those forgery groups, and 2) propagating device information and associated user activity into forgery group information.

In some cases, the user activity embedding is generated by retrieving a set of entity identifiers (e.g., UA values) associated with software entities (e.g., user agents) that have made previous image submissions using the user identifier. The user activity embedding can thus be generated from the retrieved set of entity identifiers (e.g., by using a text embedding function) and provided to the machine learning model (e.g., model 430) to obtain the profile embedding. In some embodiments, the user activity embedding is generated to include sequence information indicative of a sequence of activity by UA values associated with the user identifier. To accomplish this, timestamps (e.g., timestamp information 514) associated with the UA values can be accessed, and a neural network (e.g., neural network 624) can be used to encode sequence information indicative of when historical user agents associated with the UA values made submissions to the computer system. The user activity embedding can also be generated to include burst information (e.g., burst information 629B) indicative of recent activity associated with the user identifier relative to historical activity.

Method 1000 concludes in 1020, in which a forgery prediction (e.g., forgery prediction 150) for the image is produced by a neural network (e.g., neural network 140) based on the image pixel embedding and the profile embedding.

Many variations of method 1000 are possible. One such variation commences with receiving, at a computer system, a submission for authentication that includes an image and a user identifier for a user making the submission. Then a prediction module within the computer system generates a forgery prediction indicative of whether the image has been altered.

Generating the forgery prediction may include several sub-steps. An image pixel embedding can be generated from the image. A profile embedding indicative of whether the user is associated with known image forgeries can be generated. The profile embedding is generated by a machine learning model from a user activity embedding that includes historical activity associated with the user identifier.

This variation of method 1000 concludes with a neural network outputting the forgery prediction from the image pixel embedding and the profile embedding.

In some embodiments, the disclosed system may be trained by traversing a set of training data having submissions including User-Agent (UA) values. The traversing of a given submission in the set of training data may include generating a device embedding of a UA value for the given submission and inputting the device embedding to the machine learning model to generate learned parameters usable to associate user activity within image forgeries. Moreover, the machine learning model may use a first graph, a second graph, and an initial forgery group (FG) embedding in some embodiments to generate the learned parameters. The first graph indicates relationships between user identifiers and associated UA values in the set of training data, while the second graph indicates relationships between UA values and image forgery groups in the set of training data. The initial FG embedding is generated from forgery groups identified in the set of training data.

Figure 10B:
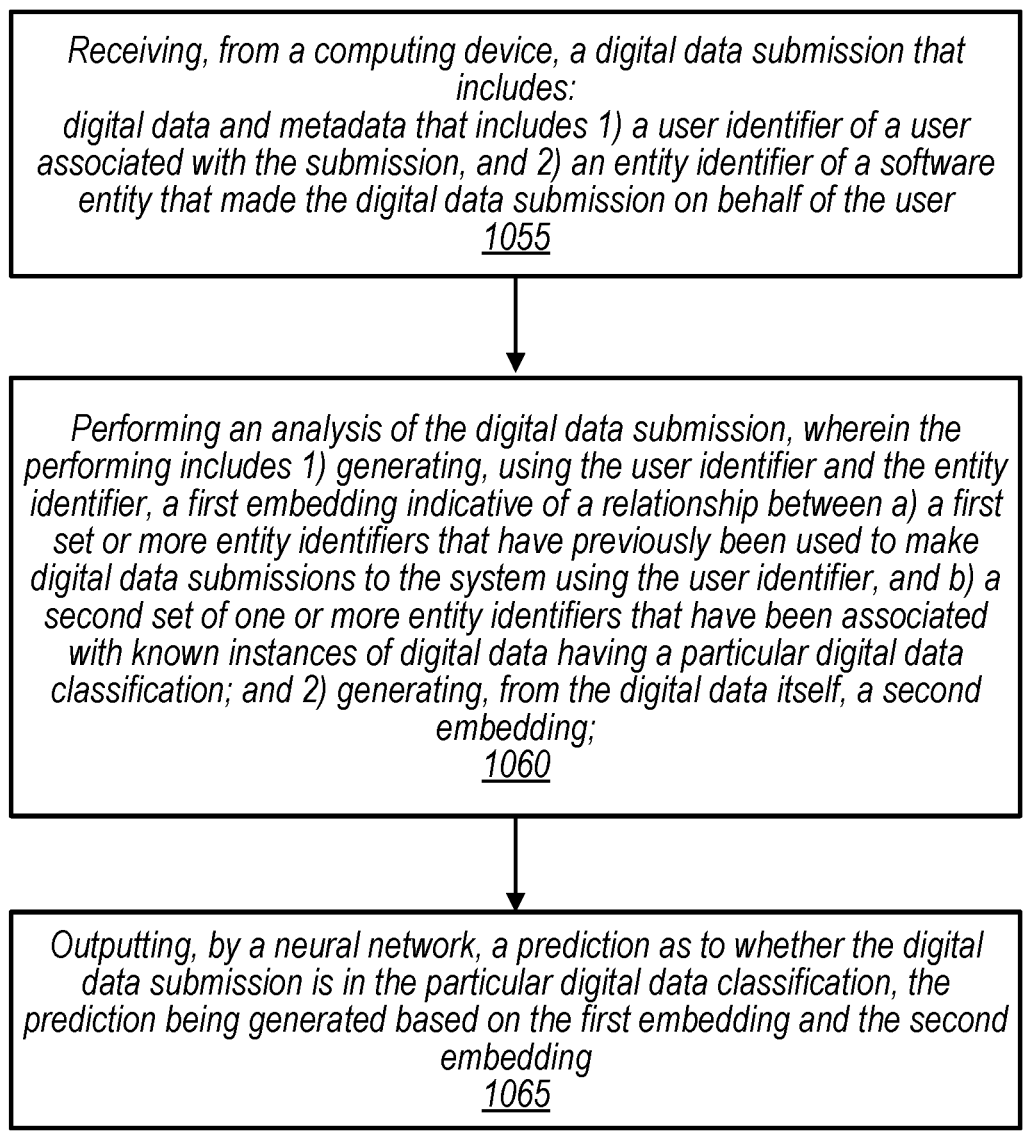
FIG. 10B is a flow diagram of one embodiment of a method of digital data analysis.

FIG. 10B is a flow diagram of one embodiment of a generalized version of method 1000. Method 1050 is not limited to image forgery analysis. Method 1050 may be performed in various embodiments by a system such as system 900 depicted in FIG. 9.

Method 1050 begins in 1055, in which a digital data submission (e.g., digital submission 910) is received. The digital data submission includes digital data (e.g., submission 912) and metadata (e.g., metadata 914). The metadata includes a user identifier of a user associated with the submission, as well an entity identifier of a software entity that made the digital data submission on behalf of the user. In one embodiment, the entity identifier is a User-Agent (UA) value.

In 1060, an analysis of the digital data submission is performed. This analysis may include generating a first embedding and a second embedding. The first embedding is generated using the user identifier and the entity identifier, and is indicative of a relationship between 1) a first set or more entity identifiers that have previously been used to make digital data submissions to the system using the user identifier (i.e., user activity); and 2) a second set of one or more entity identifiers that have been associated with known instances of digital data having a particular digital data classification (e.g., a malicious data classification). The second embedding, on the other hand, is generated from the digital data itself.

In 1065, a neural network outputs a prediction as to whether the digital data submission is in the particular digital data classification. This prediction is generated based on the first embedding and the second embedding.

In one embodiment, method 1050 is directed to image forgery analysis. That is, the digital data is an image, and the first embedding is a profile embedding. The second embedding is an image pixel embedding generated via a convolutional neural network. The particular digital data classification indicates that the image is a forgery.

In some implementations of method 1050, the profile embedding is generated by a convolution model that receives a user activity embedding as an input. The convolution model been trained to learn relationships between user activity and known image forgery groups. The user activity embedding is generated using historical UA values associated with the user identifier. In some cases, the user activity embedding has sequence information and burst information, where the burst information provides an indication of recent activity associated with the user identifier relative to historical activity. The convolution model may have been trained to learn relationships between user activity and known image forgery groups.

Various techniques described herein, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. Such a system may be implemented on a computer server system in some embodiments (e.g., an authentication server). Such a server may include a processor subsystem that is coupled to a system memory and I/O interfaces(s) via an interconnect (e.g., a system bus). The I/O interface(s) may be coupled to a computer network for receiving and sending communications.

The processor subsystem may include one or more processors or processing units. In various embodiments, multiple instances of the processor subsystem may be coupled to the interconnect. Processor subsystem (or each processor sub-unit) may contain a cache or other form of on-board memory.

System memory is usable store program instructions executable by the processor subsystem to cause the server system perform various operations described herein. System memory may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in the server system is not limited to primary storage. Rather, the server system may also include other forms of storage such as cache memory in processor subsystem and secondary storage within the I/O Devices (e.g., a hard drive, storage array, etc.). In some embodiments, these other forms of storage may also store program instructions executable by the processor subsystem. In some embodiments, program instructions that when executed implement embedding engine 120 may be included/stored within the system memory.

The I/O interfaces may be any of various types of interfaces configured to couple to and communicate with other devices, according to various embodiments. The I/O interfaces may be coupled to one or more I/O devices via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). Thus, the server system may thus be coupled to a network via a network interface device in order to receive authentication requests and provide responses thereto.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   receiving, at a computer system, a submission for authentication that includes an image and a user identifier for a user making the submission; and
   generating, by a prediction module within the computer system, a forgery prediction indicative of whether the image has been altered, wherein generating the forgery prediction includes:
      generating an image pixel embedding from the image;
      generating a profile embedding indicative of whether the user is associated with known image forgeries, wherein the profile embedding is generated by a machine learning model from a user activity embedding that is based on a) historical activity associated with the user identifier and b) a current User-Agent (UA) value associated with the submission, wherein learned parameters of the machine learning model have been determined using information convolution between 1) user activity information and device information, and 2) forgery group information and device information, wherein the user activity information, the device information, and the forgery group information are each expressed as UA values; and
   outputting, by a neural network that receives the image pixel embedding and the profile embedding, the forgery prediction.

2. The method of claim 1, wherein the user activity embedding includes information about software entities associated with the user identifier that have previously made image submissions to the computer system.

3. The method of claim 1, wherein the user activity embedding is generated from User-Agent (UA) values indicative of user agents associated with the user identifier that have previously made image submissions to the computer system.

4. The method of claim 1, further comprising generating the user activity embedding by:
   retrieving User-Agent (UA) values from a historical information table using the user identifier; and
   performing a text embedding function to transform the retrieved UA values into a numerical vector.

5. The method of claim 4, wherein generating the user activity embedding further includes:
   accessing timestamps associated with the UA values; and
   using a neural network to encode sequence information indicative of when historical user agents associated with the UA values made submissions to the computer system.

6. The method of claim 4, wherein generating the user activity embedding further includes burst information in the user activity embedding, the burst information being indicative of the user's frequency of accesses made to the computer system.

7. The method of claim 1, wherein the machine learning model is operable to use the burst information as weights to indicate whether the user is behaving abnormally.

8. The method of claim 1, wherein the information convolution between user activity information and device information includes 1) propagating information that relates forgery group information and device information into user activity information, and 2) propagating user activity information into device information; and wherein the information convolution between forgery group information and device information includes 1) propagating information from each forgery group to devices associated with those forgery groups, and 2) propagating device information and associated user activity into forgery group information.

9. The method of claim 1, wherein the prediction module is trained by:

traversing a set of training data having submissions including User-Agent (UA) values, wherein the traversing of a given submission in the set of training data includes generating a device embedding of a UA value for the given submission and inputting the device embedding to the machine learning model to generate learned parameters usable to associate user activity within image forgeries.

10. The method of claim 9, wherein the machine learning model uses a first graph, a second graph, and an initial forgery group embedding to generate the learned parameters, the first graph indicating relationships between user identifiers and associated UA values in the set of training data, the second graph indicating relationships between UA values and image forgery groups in the set of training data, and the initial forgery group embedding being generated from forgery groups identified in the set of training data.

11. A non-transitory, computer-readable medium storing program instructions executable by a computer system to perform operations comprising:

receiving, from a particular software entity, a submission that includes an image and a user identifier;
generating an image pixel embedding for the image;
generating, from an indication of user activity associated with the user identifier, a profile embedding for the image, wherein the profile embedding is generated using a machine learning model that includes learned parameters that have been determined using information convolution between 1) user activity information and device information, and 2) forgery group information and device information, wherein the user activity information, the device information, and the forgery group information are each expressed as User-Agent (UA) values; and
producing, by a neural network based on the image pixel embedding and the profile embedding, a forgery prediction for the image.

12. The non-transitory, computer-readable medium of claim 11, wherein the operations further comprise:

retrieving a set of entity identifiers associated with software entities that have made previous image submissions using the user identifier;
generating, from the retrieved set of entity identifiers, a user activity embedding; and
providing the user activity embedding to the machine learning model to obtain the profile embedding.

13. The non-transitory, computer-readable medium of claim 12, wherein the set of entity identifiers are UA values.

14. The non-transitory, computer-readable medium of claim 13, wherein the user activity embedding is generated to include sequence information indicative of a sequence of activity by UA values associated with the user identifier.

15. The non-transitory, computer-readable medium of claim 14, wherein the user activity embedding is generated to include burst information indicative of recent activity associated with the user identifier relative to historical activity.

16. A system, comprising:

a processor subsystem;
a memory subsystem storing program instructions executable by the processor subsystem to perform operations that include:
receiving, from a computing device, a digital data submission that includes:
digital data; and
metadata that includes a user identifier of a user associated with the digital data submission, and an entity identifier of a software entity that made the digital data submission on behalf of the user;
performing an analysis of the digital data submission using a machine learning model, wherein the performing includes:
generating, using the user identifier and the entity identifier, a first embedding indicative of a relationship between:
a first set or more entity identifiers that have previously been used to make digital data submissions to the system using the user identifier; and
a second set of one or more entity identifiers that have been associated with known instances of digital data having a particular digital data classification; and
generating, from the digital data itself, a second embedding; and
outputting, by a neural network, a prediction as to whether the digital data submission is in the particular digital data classification, wherein the prediction is generated based on the first embedding and the second embedding; and
wherein learned parameters of the machine learning model have been determined using information convolution between 1) user activity information and device information, and 2) forgery group information and device information, wherein the user activity information, the device information, and the forgery group information are each expressed as User-Agent (UA) values.

17. The system of claim 16, wherein the digital data is an image, the first embedding is a profile embedding, the second embedding is an image pixel embedding generated via a convolutional neural network, and the particular digital data classification indicates that the image is a forgery.

18. The system of claim 16, wherein the entity identifier for the digital data submission is a User-Agent (UA) value indicative of a user agent that submitted the digital data on behalf of the user, and wherein the first embedding is a profile embedding generated by the machine learning model that receives a user activity embedding as an input, the user activity embedding being generated using historical UA values associated with the user identifier.

19. The system of claim 18, wherein the machine learning model has been trained to learn relationships between user activity and known image forgery groups, wherein the machine learning model uses a first graph, a second graph, and an initial forgery group embedding to generate the learned parameters, the first graph indicating relationships between user identifiers and associated UA values in the set of training data, the second graph indicating relationships between UA values and image forgery groups in the set of training data, and the initial forgery group embedding being generated from forgery groups identified in the set of training data.

20. The system of claim 18, wherein the user activity embedding has sequence information and burst information, the burst information providing an indication of recent activity associated with the user identifier relative to historical activity.

* * * * *